United States Patent
Wessman et al.

(10) Patent No.: US 12,371,131 B2
(45) Date of Patent: Jul. 29, 2025

(54) HULL UNIT WITH A HYDROFOIL SYSTEM AND MARINE VESSEL

(71) Applicant: VOLVO PENTA CORPORATION, Gothenburg (SE)

(72) Inventors: Björn Wessman, Torslanda (SE); Brodén Fredrik, Torslanda (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 560 days.

(21) Appl. No.: 17/756,846

(22) PCT Filed: Dec. 10, 2019

(86) PCT No.: PCT/EP2019/084431
§ 371 (c)(1),
(2) Date: Jun. 3, 2022

(87) PCT Pub. No.: WO2021/115570
PCT Pub. Date: Jun. 17, 2021

(65) Prior Publication Data
US 2023/0002007 A1    Jan. 5, 2023

(51) Int. Cl.
*B63B 1/30* (2006.01)
*B63B 1/08* (2006.01)
(Continued)

(52) U.S. Cl.
CPC ............. *B63B 1/30* (2013.01); *B63B 1/08* (2013.01); *B63B 83/30* (2020.01); *B63H 20/106* (2013.01);
(Continued)

(58) Field of Classification Search
CPC ....... B63B 1/08; B63B 1/28; B63B 2001/281; B63B 1/285; B63B 1/286; B63B 1/30;
(Continued)

(56) References Cited

U.S. PATENT DOCUMENTS

| 2,984,197 A | 5/1961 | Bader |
| 3,982,493 A | 9/1976 | Cronin |

(Continued)

FOREIGN PATENT DOCUMENTS

| CN | 106458288 A | 2/2017 |
| CN | 107226169 A | 10/2017 |

(Continued)

OTHER PUBLICATIONS

International Search Report and Written Opinion in corresponding International Application No. PCT/EP2019/084431 mailed Apr. 20, 2020 (11 pages).

(Continued)

*Primary Examiner* — Ajay Vasudeva
(74) *Attorney, Agent, or Firm* — Venable LLP; Jeffri A. Kaminski

(57) ABSTRACT

An auxiliary hull unit detachably mounted to a transom on a marine vessel, wherein the hull unit is mounted at least partially below the water line of the vessel and arranged to extend rearwards parallel to the rearward extension of hull sections adjacent to the hull unit. The hull unit comprises a rear hydrofoil system for the marine vessel; the rear hydrofoil system comprising at least one pair of foldable hydrofoils which are pivotable in a lateral direction relative to the hull unit, wherein each hydrofoil is controllable by at least one actuator for displacement of the at least one pair of foldable hydrofoils in the lateral direction of the hull unit between a stowed position and a deployed position. The hull unit can be provided with a propulsion unit.

14 Claims, 11 Drawing Sheets

(51) Int. Cl.
  *B63B 1/28* (2006.01)
  *B63B 83/30* (2020.01)
  *B63H 5/125* (2006.01)
  *B63H 20/10* (2006.01)
  *B63J 3/00* (2006.01)
(52) U.S. Cl.
  CPC .............................. *B63B 2001/281* (2013.01);
    *B63H 2005/1256* (2013.01); *B63H 2005/1258*
    (2013.01); *B63J 2003/002* (2013.01); *Y02T*
    *70/10* (2013.01)
(58) Field of Classification Search
  CPC .... B63H 2005/1254; B63H 2005/1256; B63H
    2005/1258
  See application file for complete search history.

(56) References Cited

U.S. PATENT DOCUMENTS

| | | | |
|---|---|---|---|
| 4,335,671 A | 6/1982 | Warner et al. | |
| 4,967,682 A | 11/1990 | O'Donnell | |
| 4,977,977 A * | 12/1990 | Von Widmann | B63H 21/305 |
| | | | 181/269 |
| 5,293,832 A * | 3/1994 | Potter, Jr. | B63H 20/06 |
| | | | 248/641 |
| 8,286,574 B2 * | 10/2012 | Muller | B63B 27/36 |
| | | | 114/259 |
| 8,943,993 B2 * | 2/2015 | Mueller | B63B 1/32 |
| | | | 114/291 |
| 9,802,684 B2 * | 10/2017 | Sheedy | B63B 34/75 |
| 11,679,841 B2 * | 6/2023 | Michaeli | B63B 7/00 |
| | | | 114/65 R |
| 2014/0000504 A1 | 1/2014 | Mueller | |

FOREIGN PATENT DOCUMENTS

| | | | |
|---|---|---|---|
| EP | 0518229 A1 | 12/1992 | |
| WO | WO-2008095323 A1 * | 8/2008 | ............ B63B 39/06 |
| WO | 2019202220 A1 | 10/2019 | |
| WO | 2019202221 A1 | 10/2019 | |
| WO | 2021032277 A1 | 2/2021 | |

OTHER PUBLICATIONS

Chinese Office Action dated Mar. 22, 2025 in corresponding Chinese Patent Application No. 201980102855.6, 12 pages.

* cited by examiner

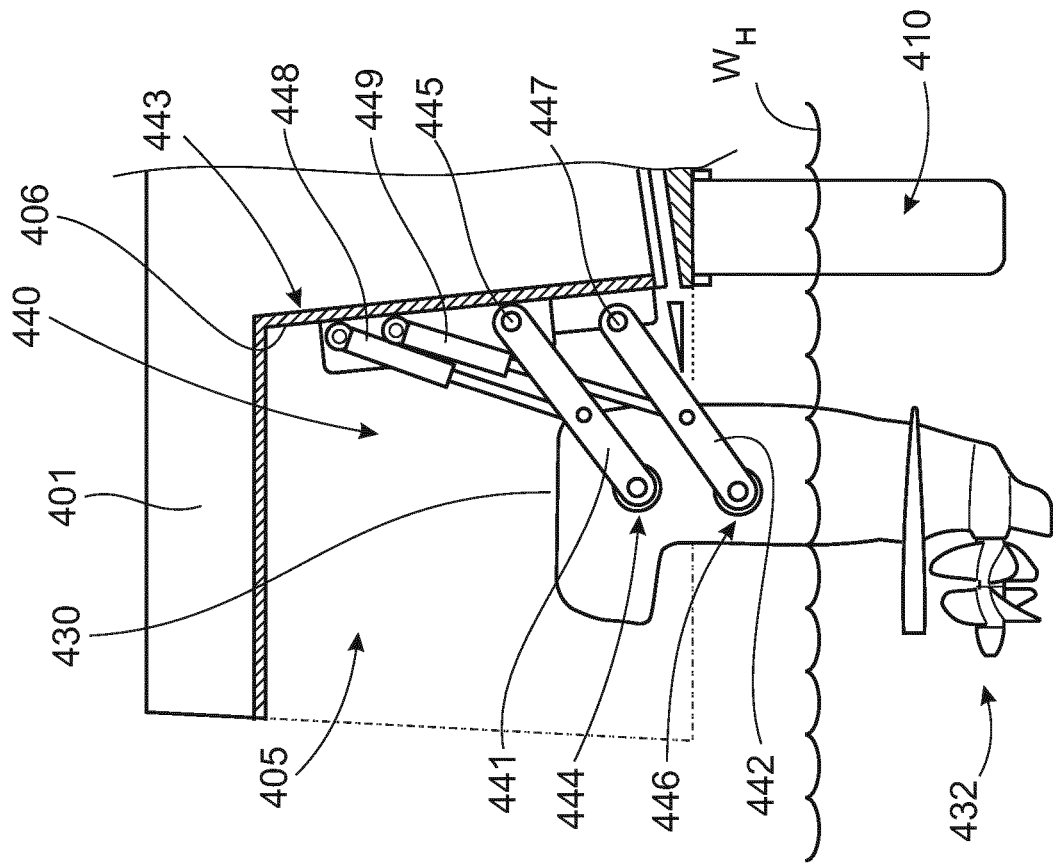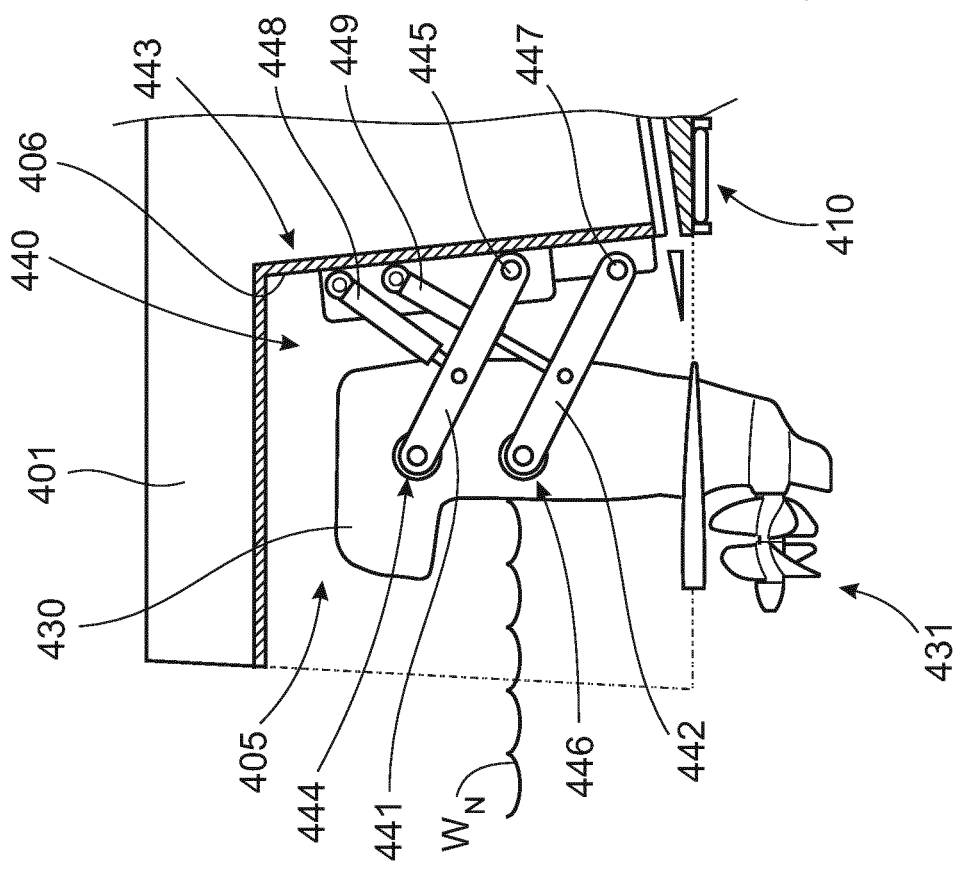

HULL UNIT WITH A HYDROFOIL SYSTEM AND MARINE VESSEL

CROSS-REFERENCE TO RELATED APPLICATIONS

This application is a U.S. National Stage application of PCT/EP2019/084431, filed Dec. 10, 2019 and published on Jun. 17, 2021, as WO 2021/115570, all of which is hereby incorporated by reference in its entirety.

TECHNICAL FIELD

The present invention relates to an auxiliary hull unit comprising a hydrofoil system and a marine vessel with such an auxiliary hull unit.

BACKGROUND

Known hydrofoil boats are usually provided with at least one hydrofoil consisting of a wing like structure mounted on struts below the hull, or across the keels of a catamaran in a variety of boats. A hydrofoil operates in the same way as a wing-shaped air foil to create a lifting force and can have a similar cross-section. As a hydrofoil-equipped watercraft increases in speed, the hydrofoil elements below the hull develop enough lift to raise the hull out of the water, which greatly reduces hull drag. This provides a corresponding increase in speed and fuel efficiency, as less propulsive force is required to drive the vessel.

When used as a lifting element on a hydrofoil boat, the upward force exerted by the hydrofoil lifts the body of the vessel clear of the water, thereby decreasing drag of the hull and increasing the speed of the vessel. The lifting force eventually balances with the weight of the craft, reaching a point where the hydrofoil no longer lifts out of the water but remains in equilibrium. Since wave resistance and other impeding forces such as various types of drag on the hull are eliminated as the hull lifts clear, turbulence and drag act increasingly on the much smaller surface area of the hydrofoil, and decreasingly on the relative larger area of the hull, creating a marked increase in speed. In the case of fixed hydrofoils, the lifting force will be dependent on the speed of the vessel. Alternatively, hydrofoils can be provided with control surfaces in the same way as an aircraft wing, whereby the control surfaces can be angled to increase or decrease the lifting force. Once the hull is lifted clear of the water, the effect of the reduced drag can be used for increased speed, while maintaining the output of the propulsion system. Alternatively, the reduced drag can be used for increased fuel economy, while reducing the output of the propulsion system to a lower level once the hull is lifted clear of the water.

U.S. Pat. No. 4,335,671 discloses a vessel comprising fixed hydrofoils. A problem with this solution is the increased draft created by the hydrofoils which makes it impossible for these vessels to navigate in shallow waters. A further problem is the increased drag experienced by fixed hydrofoil vessels when travelling at speeds where the hull is in contact with the water.

Various solutions have been suggested to overcome the above problems relating to drag and draft. U.S. Pat. No. 2,984,197 discloses a vessel comprising front and rear hydrofoils which are retractable into contact with the hull of the vessel. A problem with this solution is that the retracted hydrofoils extend outside the envelope of the submerged hull when the hydrofoils are stowed. Compared to fixed hydrofoil vessels, the draft is reduced but the drag created by the retracted hydrofoils at low speed is still substantial.

A further problem relating to the above-mentioned solutions is that the fitting of a hydrofoil system often requires a substantial modification of the hull of a vessel. In the case of retractable hydrofoils, as shown in U.S. Pat. No. 2,984,197, this is a particular problem for rear hydrofoils which are located in a part of the vessel which also has to accommodate a propulsion unit as well as space for both passengers and storage compartments. This causes problems both for packaging of the hydrofoil system and its control means, and for accessibility when performing subsequent maintenance and repair.

The invention provides an improved arrangement aiming to solve the above-mentioned problems.

SUMMARY

An object of the invention is to provide an auxiliary hull unit for a vessel, which hull unit solves the above-mentioned problems.

The object is achieved by an auxiliary hull unit comprising a hydrofoil system and a marine vessel comprising such an auxiliary hull unit according to the appended claims.

In the subsequent text, the term "water line" is defined as the level around the hull reached by the surrounding water when the vessel is at rest. The term "longitudinal axis" is defined as an axis extending between the bow and the stern of the vessel in line with the keel. With respect to the foldable hydrofoils, the term "stowed position" refers to a position where the hydrofoils are inoperative and fully retracted. Similarly, the term "deployed position" refers to a position where the hydrofoils are operative and fully deployed. The terms "front", "forward", "rear", "rearward" and similar directional terms are to be taken in the longitudinal direction of the vessel and in its main direction of travel. The term "lateral direction" is intended to describe a direction that is substantially transverse or at right angles to the longitudinal direction of the marine vessel and the auxiliary hull unit. Further, the term "power source" is intended to denote a source of mechanical, hydraulic or electric power for operating different parts of the vessel or the auxiliary drive unit. A mechanical power source can be an internal combustion engine (ICE) operated on a suitable fossil fuel or an alternative fuel, such as a biofuel or hydrogen. A hydraulic power source can be a pump or accumulator supplying fluid pressure to an actuator or similar. An electric power source can be an electric motor operated by a storage unit, such as a battery, or a fuel cell. The term "power storage" denotes a power storing or supplying component used for operating a power source. Non-limiting examples of power storage means are battery packs, electricity generating fuel cells and tanks for various types of fuel.

According to a first aspect of the invention, the invention relates to an auxiliary hull unit detachably mounted to a transom on a marine vessel, wherein the hull unit is mounted at least partially below the water line of the vessel and arranged to extend rearwards parallel to the rearward extension of vessel hull sections adjacent to the hull unit. The hull unit comprises a rear hydrofoil system for the marine vessel, which hydrofoil system allows foldable hydrofoils to be deployed when it is desired to increase the speed of the marine vessel to enter foiling mode.

A suitable hydrofoil system to be arranged in a forward portion of the vessel is described in the application PCT/EP2019/072138 which is hereby incorporated by reference.

As the invention relates to an auxiliary hull unit comprising a rearward hydrofoil system, forward hydrofoil systems will not be described in further detail in the subsequent text.

The rear hydrofoil system comprises at least one pair of foldable hydrofoils which are pivotable in a lateral direction relative to the longitudinal axis of the auxiliary hull unit, wherein each hydrofoil is controllable by at least one actuator for displacement of the at least one pair of foldable hydrofoils in the lateral direction of the hull unit between a stowed position and a deployed position. Each foldable hydrofoil comprises a first portion comprising a first end which first end is mounted hinged relative to the auxiliary hull unit and on opposite sides thereof. The function of the first portion is the act as a strut or support for a foiling portion that provides a lifting force. Each foldable hydrofoil further comprises a second portion comprising a free second end extending away from the respective first portion towards the opposite side of the hull unit and at an obtuse angle relative to the first portion. The second function of the second portion is to form a foiling portion or wing that creates lift when deployed. The first and second portions are joined at their respective second ends to form a general wing shaped foil. The join between the first and second portions can have a shape that is dependent on the shape of the adjacent hull section of the auxiliary hull unit. Consequently, such a join can be shaped as a distinct sharp line or as a section having a rounded or curved transition. The foldable hydrofoils are preferably at least flush with the auxiliary hull unit in the stowed position, in order to minimize drag and flow resistance when the vessel is travelling at low or planing speeds.

A lower outer surface of each hydrofoil is at least flush with the submerged outer surface of the hull in front of the hydrofoil when the hydrofoil is in the stowed position. In this context, an outer surface of the hydrofoil faces away from the outer surface of the hull. By locating the stowed hydrofoils so that their outer surfaces are flush with or inside the envelope of the outer hull surface immediately behind a step in the hull or the auxiliary hull unit, it is possible to virtually eliminate any drag from the stowed hydrofoils when the vessel is travelling at low or planing speeds. In order to reduce drag as well as air resistance, an outer side surface of each hydrofoil can be located in a recess in the side of the hull located above the water line when the hydrofoil is in the stowed position. The recesses in the opposite sides of the hull can form a continuation of a submerged step in the auxiliary hull unit.

Each hydrofoil comprises a single structural component having a generally angled wing shape. The shape of the hydrofoil conforms to the outer surface of the hull at least below and preferably also above the water line. In this way at least the submerged portion of the hydrofoil conforms with and is located at least flush with the outer surface of an adjacent portion of the hull. This is achieved by giving the outer surface of each hydrofoil the same cross-sectional shape as the outer surface of the hull immediately in front of the respective stowed hydrofoil. In this example, the cross-sections are taken at right angles to the longitudinal axis of the vessel.

The first end of each foldable hydrofoil comprises a hinge having parallel or near parallel pivot axes extending in the longitudinal direction of the marine vessel, in a plan view of the vessel. The hinges allow the hydrofoils to be pivoted away from the hull of the vessel, so that a foiling portion of the second portions can provide a lifting force sufficient to lift the hull clear of the water. Simultaneously, one or more drive units for propelling the vessel are extended downwards to allow the drive units to remain submerged as the hull of the vessel is lifted out of the water by the hydrofoils with increasing speed.

According to a first example, the auxiliary hull unit can have the first portion of each hydrofoil extending adjacent the hull unit along its entire length when the hydrofoil is in the stowed position. The second portion of each hydrofoil can be arranged to extend into a lateral cavity in the hull unit when the hydrofoil is in the stowed position. In this example, the second portion of each hydrofoil can be arranged to extend inwards and upwards into the lateral cavity in the hull unit when in the stowed position. In addition, the free second end of each second portion can be arranged to extend up to a vertical plane through the longitudinal axis of the hull unit when the hydrofoil is in the stowed position. In this way the hydrofoils can be deployed and retracted simultaneously, as they do not interfere with each other. Hydrofoils according to this example can be suited for smaller and/or relatively light vessels, requiring a correspondingly smaller lifting force to make the hull clear the surface of the water.

According to this example, at least the side portions of the auxiliary hull unit can be arranged as an inward step relative to the side portions of the hull of the vessel adjacent the transom. The inward step will extend along the entire length of the auxiliary hull unit. The recessed depth of the step can be at least equal to the thickness of the first portion of the corresponding hydrofoil in its stowed position, whereby drag can be eliminated or at least significantly reduced for the part of the first portion of the hydrofoil that extends below the waterline when the vessel is travelling at low or planing speeds. Alternatively, such an inward step can be provided in the side portions of the auxiliary hull unit itself. The inward step will extend along the remaining rearward length of the auxiliary hull unit. This option can be used when the foldable hydrofoils are located at a position in the hull unit remote from the transom of the vessel.

The lateral cavity can be arranged to extend into the bottom or lower hull portion of the auxiliary hull unit below the waterline. In order to avoid a forward facing, drag inducing surface, the lateral cavity can open up gradually or completely in the rearward direction of the hull unit. The cavity for the second portions of the hydrofoils is always located in the lateral direction of the inwards step in the hull unit.

According to a second example, the auxiliary hull unit can have the first portion of each hydrofoil extending adjacent the hull unit up to the central longitudinal axis of the hull unit when the hydrofoil is in the stowed position. The second portion of each hydrofoil can be arranged to extend adjacent the hull unit past the central longitudinal axis of the hull unit. The second ends of each pair of hydrofoils can be arranged to extend a predetermined distance past the central longitudinal axis of the auxiliary hull unit. Hydrofoils according to this example are suited for larger and/or relatively heavy vessels, requiring a correspondingly larger lifting force to make the hull clear the surface of the water.

According to this example, at least the side portions of the auxiliary hull unit can be arranged as an inward step relative to the side portions of the hull of the vessel adjacent the transom. The inward step will extend along the entire length of the auxiliary hull unit. The recessed depth of the step can be at least equal to the thickness of the first portion of the corresponding hydrofoil in its stowed position, whereby drag can be eliminated or at least significantly reduced for the part of the first portion of the hydrofoil that extends below the waterline when the vessel is travelling at low or planing speeds. Alternatively, such an inward step can be provided in the side portions of the auxiliary hull unit itself. The inward step will extend along the remaining rearward length of the auxiliary hull unit. This option can be used when the foldable hydrofoils are located at a position in the hull unit remote from the transom of the vessel.

According to a preferred example, each pair of hydrofoils can be arranged to overlap in the lateral direction of the hull unit when the hydrofoils are in the stowed position. In the stowed position, a first hydrofoil will extend adjacent the hull unit along its entire extension while the opposite, second hydrofoil will extend partially adjacent the hull unit and partially adjacent the second portion and a part of the first portion of the first hydrofoil. In this example, the overlapping first and second hydrofoils are arranged to be displaced in a predetermined order. During deployment, the overlapping hydrofoils are arranged to be displaced sequentially when moved towards their operative positions, wherein the outermost hydrofoil is actuated first. During retraction of the hydrofoils towards the stowed position the hydrofoils are actuated in reverse, wherein the innermost hydrofoil is actuated first. In addition, the lower part of the hull unit, where the first and second hydrofoils the hull unit are arranged to overlap on either side of the longitudinal axis of the unit, will require a deeper inward step in order to accommodate the overlapping foil portions. This deeper recessed inward step will extend along the remaining rearward length of the auxiliary hull unit.

According to a further example, each pair of hydrofoils can be arranged side-by-side in the lateral direction of the hull unit when the hydrofoils are in the stowed position. Hence, a first hydrofoil is positioned in front of a second hydrofoil in the longitudinal direction of the auxiliary hull unit. In this example, the longitudinally offset hydrofoils are arranged to be displaced simultaneously when moved towards the deployed position. Here, at least the side portions of the auxiliary hull unit can be arranged as an inward step relative to the side portions of the hull of the vessel adjacent the transom. The inward step will extend along the entire length of the auxiliary hull unit. The depth of the step can be at least equal to the thickness of the first and second portions of the hydrofoils in their stowed positions, whereby drag can be eliminated or at least significantly reduced for the part of the first portion of the hydrofoil that extends below the waterline when the vessel is travelling at low or planing speeds. Alternatively, such an inward step can be provided in the side portions of the auxiliary hull unit itself. The inward step will extend along the remaining rearward length of the auxiliary hull unit. This option can be used when the foldable hydrofoils are located at a position in the hull unit remote from the transom of the vessel. If desired, the inward step on one side of the auxiliary unit can be offset in the longitudinal direction of the vessel, in order to conform to the corresponding offset of the rear second hydrofoil.

In the latter example where the stowed hydrofoils are side-by-side adjacent the hull, the first ends of both foldable hydrofoils can comprise a hinge having a pivot axis extending in the horizontal plane in the longitudinal direction of the marine vessel. When these hydrofoils are deployed, the submerged second ends of each hydrofoil will be offset in the longitudinal direction of the vessel when each hydrofoil reaches its operative position. As the hydrofoils are deployed non-symmetrically, or offset in the lateral direction, a moment is generated about the centre of gravity of the vessel. This moment will require a steering correction in order to maintain the vessel on a straight heading.

In all the above-mentioned examples, the first end of each foldable hydrofoil comprises a hinge having pivot axes extending in parallel with the longitudinal axis of the hull unit. These hinges allow the hydrofoils to be pivoted outwards from their stowed positions into their respective deployed positions.

The auxiliary hull unit only requires a limited number of fixed attachment points. Attachment of the hull unit can be achieved by any suitable heavy-duty fastening means. A non-limiting list of fastening means comprises screw and nut fasteners, keyhole-type fasteners, hook-and-slot type fasteners, interlocking profiles, twist-lock fasteners or any combination of the above fasteners. Fasteners of this type are well known in the field of marine vessels and will not be described in further detail. The number of attachment points is dependent on the size and displacement of the auxiliary hull unit, as well as the power output of the one or more propulsion units.

The auxiliary hull unit described above is provided with at least one actuator for controlling displacement of the hydrofoils. Each hydrofoil can be connected to at least one actuator arranged within the auxiliary hull unit and arranged to displace the hydrofoils between their stowed and deployed positions. The at least one actuator is preferably, but not necessarily, arranged below the water line within the auxiliary hull unit. The size and number of actuators is dependent on the force required to deploy and maintain the hydrofoils in their operative positions. For relatively small vessels it can be sufficient to provide a single actuator for displacing the hydrofoils on both sides of the vessel. Relatively larger vessels can require one or possibly two actuators per hydrofoil.

The at least one actuator is arranged to be operated by a suitable power source within a self-contained auxiliary hull unit. The power source can be an electric motor or an internal combustion engine (ICE). An electric motor can be operated using electric power from a storage battery or a fuel cell, which motor can drive the at least one actuator directly or by driving a pump providing hydraulic or fluid pressure. Alternatively, an ICE using fossil or alternative fuels can be operated to drive a generator to provide electric power, or a pump providing hydraulic or fluid pressure. According to one example, the auxiliary hull unit can be self-contained and be provided with a water tight compartment within the hull unit comprising both a power source, such as an electric motor or an ICE, and an energy storage, such as a battery of a fuel tank, as well as a suitable electric or hydraulic means for driving the at least one actuator.

According to an alternative example, the auxiliary hull unit is partially self-contained and comprises a power source and/or a power storage as described above for driving the at least one actuator. In this case, an energy storage, such as a battery of a fuel tank, can be provided on-board the marine vessel.

An electronic control unit for the actuators controlling the hydrofoils can be provided in the auxiliary hull unit or on-board the vessel. Operation of the actuators is controlled by an operator via a suitable control panel or a graphical user interface on-board the vessel.

For the purpose of propulsion, a marine vessel suitable for hydrofoil operation requires at least one propulsion unit that can be displaced between a first position for low speed or planing operation, and a second position for operation at foiling speeds. The at least one propulsion unit can be located within the auxiliary hull unit or within the hull of the marine vessel.

According to one example, the auxiliary hull unit can comprise a pod propulsion unit arranged to be vertically displaceable between a stowed position and a deployed position. The auxiliary hull unit can comprise an internal power storage connected to the pod propulsion unit or a power storage located on-board the marine vessel to which the hull unit is mounted. The pod propulsion unit is preferably, but not necessarily, an electric propulsion unit.

The invention further relates to a marine vessel provided with an auxiliary hull unit comprising a hydrofoil system as described above.

The arrangement according to the invention solves the problem of increased draft as encounter by vessels comprising fixed hydrofoils, which makes it impossible for these vessels to access shallow ports or to navigate rivers. The invention also solves the problem of increased drag experienced by fixed hydrofoil vessels when travelling at speeds where the hull is in contact with the water. The solution according to the invention provides a compact arrangement that does not create undesired drag or require excessive space for the stowed hydrofoils, while also providing a lifting force sufficient for lifting the vessel out of the water when fully deployed.

A further advantage is related to the problem that foil systems are fragile and likely to break on impacting submerged or floating objects, e.g. a log in the water. Even in case of a complete breakdown failure caused by hitting a hard object, the floating capability of the vessel is not endangered as the impact forces are absorbed by the auxiliary hull unit. Further, the auxiliary hull unit can be assembled after the vessel has been built or can be retrofitted to an existing vessel to convert it to a foiling vessel. The auxiliary hull unit only requires a number of fixed attachment points and a small hole in the hull of the vessel for a control cable.

If required, a conduit for fuel or a cable for electric power can be provided when the auxiliary hull unit comprises a propulsion unit. The design of the auxiliary hull unit allows any suitable propulsion unit to be mounted, including one or more outboard drives, stern drives or electric drives.

According to a second aspect of the invention, the invention relates to a detachable auxiliary hull unit with a hydrofoil system as described above, which auxiliary hull unit comprises at least one deployable propulsion unit.

According to a first example, the auxiliary hull unit is provided with at least one propulsion unit comprising an electric motor preferably, but not necessarily, in the form of a pod. The propulsion unit is arranged to be vertically displaceable between a stowed, first position and a deployed, second position. In the stowed position the propulsion unit is used for travelling at low or planing speeds, while the deployed position is used for position for operation at foiling speeds. The auxiliary hull unit can comprise an internal a power storage connected to the pod propulsion unit or a power storage located on-board the marine vessel to which the hull unit is mounted.

The at least one propulsion unit can be displaced between the first and second positions by means of a suitable linkage controlled by one or more actuators. A single or double pivoted parallel arm linkage can be arranged to support the propulsion unit and displace it between the stowed and the deployed positions. Alternatively, the at least one propulsion unit can be displaced by means of a substantially vertical guide or rail onto which the propulsion unit is mounted. In this example, one or more controllable actuators can be used to displace the propulsion unit between the stowed and the deployed positions. Suitable actuators for this purpose can be hydraulically or electrically powered actuators.

According to a further example, the at least one propulsion unit can be displaced between the first and second positions by means of an electrically or hydraulically operated telescoping arrangement. This solution is suitable for propulsion units such as electric pod drives, since no mechanical transmission is required through an extendable leg supporting an electric pod drive. Power for operating the controllable actuators is preferably provided from a self-contained power storage within a watertight portion of the auxiliary hull unit.

The auxiliary hull unit preferably comprises an internal power storage connected to the at least one pod propulsion unit, but the hull unit can also be connected to a power storage located on-board the marine vessel to which the hull unit is mounted. The internal power storage can be a rechargeable battery pack for relatively short distance travel, or fuel cells generating electricity for travelling longer distances. One or more battery packs or fuel tanks for alternative fuels can be distributed within the auxiliary hull unit to achieve an optimal weight distribution. When battery packs with a limited range are provided for driving the at least one propulsion unit, it can be an option to provide a small combustion engine or generator to be used as a hybrid range extender. In the case of fuel cells operated using hydrogen, it may be required to provide hydrogen tanks on-board the marine vessel due to the space occupied by such tanks.

According to a second example, the auxiliary hull unit is provided with at least one propulsion unit comprising an internal combustion unit. As described above, the propulsion unit is arranged to be vertically displaceable between a stowed, first position and a deployed, second position. In the stowed position the propulsion unit is used for travelling at low or planing speeds, while the deployed position is used for position for operation at foiling speeds. The auxiliary hull unit can comprise an internal fuel tank for fossil fuels or alternative fuels, such as biofuels or hydrogen, supplying the propulsion unit. Alternatively, an external fuel supply can be located on-board the marine vessel to which the hull unit is mounted.

The at least one internal combustion engine can be displaced between the first and second positions by means of a suitable linkage controlled by one or more actuators. A single or double pivoted parallel arm linkage can be arranged to support the propulsion unit and displace it between the stowed and the deployed positions. Alternatively, the at least one propulsion unit can be displaced by means of a substantially vertical guide or rail onto which the propulsion unit is mounted. In this example, one or more controllable actuators can be used to displace the propulsion unit between the stowed and the deployed positions. Suitable actuators for this purpose can be hydraulically or electrically power actuators.

The invention further relates to a marine vessel provided with an auxiliary hull unit comprising at least one propulsion unit and a hydrofoil system as described above. Preferably, a pair of deployable hydrofoils as described above are provided in front of the at least one propulsion unit in the auxiliary hull unit. In this way, deployment of the hydrofoils does not interfere with the deployment of the one or more extendable propulsion units.

The auxiliary hull unit only requires a limited number of fixed attachment points. Attachment of the hull unit can be achieved by any suitable heavy-duty fastening means. A non-limiting list of fastening means comprises screw and nut fasteners, keyhole-type fasteners, hook-and-slot type fasteners, interlocking profiles, twist-lock fasteners or any combination of the above fasteners. Fasteners of this type are well known in the field of marine vessels and will not be described in further detail. The number of attachment points is dependent on the size and displacement of the auxiliary hull unit, as well as the power output of the one or more propulsion units.

An advantage of this solution is that the at least one propulsion unit can be made very compact and cab be hidden under an upper portion of the auxiliary hull unit that naturally becomes a swim platform or recreation space. Since the area below a recreational platform is normally unused, such a propulsion arrangement improves the packaging of the marine vessel. Further, the auxiliary hull unit can be assembled after the vessel has been built or can be retrofitted to an existing vessel to convert it to a foiling vessel with one or more extendable propulsion units. The auxiliary hull unit only requires a number of fixed attachment points and a small hole in the hull of the vessel for a control cable. The design of the auxiliary hull unit allows any suitable propulsion unit to be mounted, including one or more outboard drives, stern drives or electric drives. In this way, the propulsion units are also exchangeable and easily removable for maintenance and repair.

According to a third aspect of the invention, the invention relates to a detachable auxiliary hull unit comprising at least one folding propulsion unit.

According to a first example, the auxiliary hull unit is provided with a propulsion unit comprising two electric motors that separately power a transmission comprising one or two shafts extending through a vertical leg down to a gearbox for dual counter rotating propellers. In this example, the electric motors are arranged on either side of the transmission, with opposing output shafts connected to the transmission via bevel gears or a differential gear. The opposing output shafts of the electric motors have concentric axes and arranged in a transverse direction relative to the longitudinal direction of the marine vessel. The opposing output shafts and the bevel gears or a differential gear are enclosed in a horizontal housing arranged to support and protect the shafts and the gearing.

The vertically extending leg is rotatable about an axis coinciding with the opposing output shafts of the electric motors. This arrangement allows the vertical leg and the propellers to be swung upwards out of the water just like an outboard engine, in order to reduce corrosion and fouling. A lower portion of the vertically extending leg including the propellers can also swing 360° about a vertical axis coinciding with the vertical shaft or shafts of the transmission. The vertical shaft and the gearbox for the counter-rotating propellers are enclosed in a vertical housing formed by the leg, which vertical housing arranged to support and protect the shafts and the gearing. This arrangement improves the manoeuvrability of the vessel and also allows the vertically extending leg to be provided with different sets of propellers. In this way, the propulsion unit can either be provided with standard dual counter rotating propellers or with a dual forward-facing drive to enable wake surfing.

According to a second example, the auxiliary hull unit is provided with two propulsion units, wherein each propulsion unit comprises a separate electric motor that powers a separate transmission comprising one or two shafts extending through a vertical leg down to a gearbox for dual counter rotating propellers. In this example, the electric motors are arranged back-to-back on one side of their respective transmission, with their output shafts extending in opposite directions. Each electric motor is connected to its respective transmission via a bevel gear. The opposing output shafts of the electric motors have concentric axes and arranged in a transverse direction relative to the longitudinal direction of the marine vessel. The opposing output shafts and the bevel gears or a differential gear are enclosed in a vertical housing formed by the leg, which vertical housing is arranged to support and protect the shafts and the gearing.

The vertically extending legs are rotatable about an axis coinciding with the output shaft of its respective electric motor. This arrangement allows both vertical legs and their propellers to be swung upwards out of the water just like an outboard engine, in order to reduce corrosion and fouling. The vertically extending legs including the propellers can also be individually rotated 360° about a vertical axis coinciding with the vertical shaft or shafts of the transmission. Each vertical shaft and the gearbox for the counter-rotating propellers are enclosed in a separate vertical housing arranged to support and protect the shafts and the gearing. This arrangement improves the manoeuvrability of the vessel and also allows the vertically extending legs to be provided with different sets of propellers. In this way, the propulsion units can either be provided with standard dual counter rotating propellers or with a dual forward-facing drive to enable wake surfing. The provision of two separate motors also provides a redundancy, wherein a limp home mode can be used if one motor fails.

The auxiliary hull unit preferably comprises a self-contained, internal source of power and/or power storage connected to the at least one propulsion unit as described in the above examples. However, the auxiliary hull unit can also be connected to a power storage located on-board the marine vessel to which the hull unit is mounted. The internal power storage can be a rechargeable battery pack for relatively short distance travel, or fuel cells using alternative fuels for travelling longer distances. One or more battery packs or fuel tanks for alternative fuels can be distributed within the auxiliary hull unit to achieve an optimal weight distribution. When battery packs with a limited range are provided for driving the at least one propulsion unit, it can be an option to provide a small combustion engine or generator to be used as a hybrid range extender. In the case of fuel cells operated using hydrogen, it may be required to provide hydrogen tanks on-board the marine vessel due to the space occupied by such tanks.

The auxiliary hull unit only requires a limited number of fixed attachment points. Attachment of the hull unit can be achieved by any suitable heavy-duty fastening means. A non-limiting list of fastening means comprises screw and nut fasteners, keyhole-type fasteners, hook-and-slot type fasteners, interlocking profiles, twist-lock fasteners or any combination of the above fasteners. Fasteners of this type are well known in the field of marine vessels and will not be described in further detail. The number of attachment points is dependent on the size and displacement of the auxiliary hull unit, as well as the power output of the one or more propulsion units.

The invention further relates to a marine vessel provided with an auxiliary hull unit comprising at least one folding propulsion unit as described above.

An advantage of this solution is that the at least one propulsion unit can be made very compact and cab be hidden under an upper portion of the auxiliary hull unit that naturally becomes a swim platform or recreation space. Since the area below a recreational platform is normally unused, such a propulsion arrangement improves the packaging of the marine vessel. Further, the auxiliary hull unit can be assembled after the vessel has been built or can be retrofitted to an existing vessel to convert it for different types of propulsion units. The auxiliary hull unit only requires a number of fixed attachment points and a small hole in the hull of the vessel for a control cable. The design of the auxiliary hull unit allows any suitable propulsion unit to be mounted. In this way, the propulsion units are also exchangeable and easily removable for maintenance and repair.

A further advantage is that such propulsion units can either be provided with standard dual counter rotating propellers (pushing propellers) or with a dual forward-facing drive (pulling propellers) to enable wake surfing. This can be achieved by replacing the vertically extending leg together with the propellers. The housing part of the vertical leg can be replaced together with the shaft and the propellers to provide a streamlining suitable for either pushing or pulling propellers. The housing for the horizontal shafts and the housing for the vertical shafts can be provided with a common interface for the housings and the transmission to facilitate replacement.

The provision of two separate motors also provides a redundancy, wherein a limp home mode can be used if one motor fails Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings:

FIG. 7A-B show a schematic side view of an auxiliary hull unit comprising a propulsion unit according to a second example;

DETAILED DESCRIPTION OF EXAMPLE EMBODIMENTS OF THE INVENTION

Figure 1:
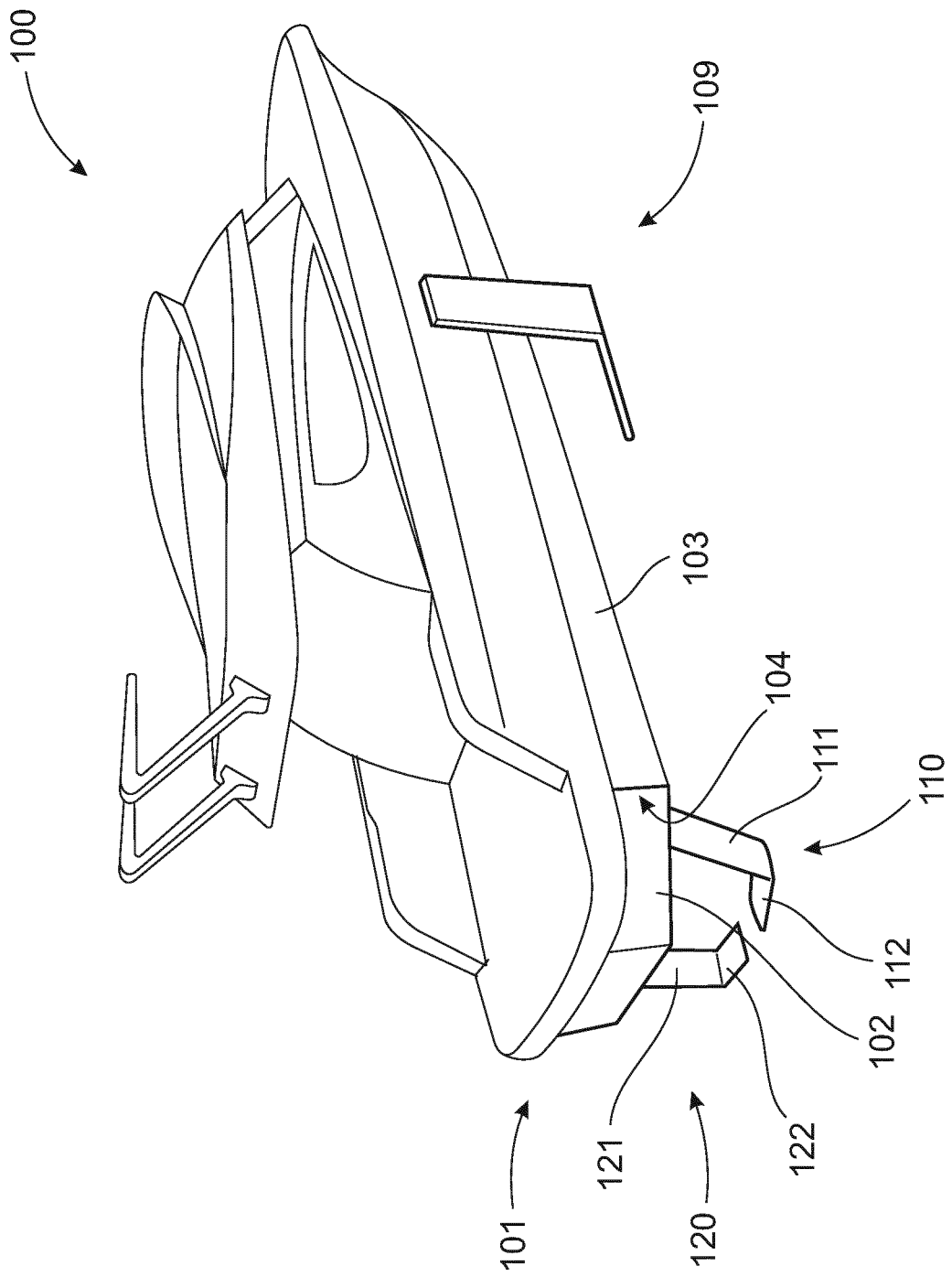
FIG. 1 shows a perspective view of a schematically illustrated vessel comprising an auxiliary hull unit with a hydrofoil system according to the invention.

FIG. 1 shows a side view of a schematically illustrated marine vessel 100 comprising main hull 103 provided with an auxiliary hull unit 101 provided with a hydrofoil system (110, 120) according to the invention. The auxiliary hull unit 101 is attached to a rear portion or transom of the hull 103 of the vessel 100. The hydrofoil system in this example comprises a pair of foldable hydrofoils 110, 120 which are pivoted relative to the auxiliary hull unit 101 and are located on the opposite side of the hull unit 101. Each hydrofoil 110, 120 is controllable by at least one actuator (not show) for displacement of the foldable hydrofoils 110, 120 in a lateral direction of the marine vessel between a stowed position and a deployed position, as showing in FIG. 3. FIG. 1 shows the hydrofoils 110, 120 in the deployed position, which allows the hull to be lifted out of the water. Each foldable hydrofoil comprises a first portion 111, 121 comprising an upper end mounted by a hinge (FIG. 3; "113, 127") relative to the auxiliary hull unit 101 on opposite sides of the marine vessel. In this example, the hinges are pivoted about an axis parallel to the longitudinal axis of the vessel. Each first portion 111, 121 extends adjacent the auxiliary hull unit 101 when the hydrofoil is in the stowed position (see FIG. 3). Each foldable hydrofoil 110, 120 further comprise a second portion 112, 122 comprising a free second end extending under the auxiliary hull unit 101. The second portions 112, 122 are arranged in a lateral cavity in the auxiliary hull unit 101 when the hydrofoil is in the stowed position. In the deployed position shown in FIG. 1, the second portions 112, 122 form foiling portions or wings which create a lifting force for lifting the hull 103 out of the water. The vessel is also provided with a drive unit (not shown) for propelling the vessel. The drive unit is adjustable in the vertical direction (see FIG. 3) together with the hydrofoils 110, 120 in order to maintain the propellers submerged.

The hydrofoils 110, 120 arranged on the auxiliary hull unit 101 provide a lifting force for the rear portion of the vessel 100. In order to provide a lifting force for the main hull 103 of the vessel, a pair of deployable main hydrofoils 109 (one shown) are mounted to the main hull 103. A hydrofoil system suitable for this purpose is described in the application PCT/EP2019/072138.

Figure 2:
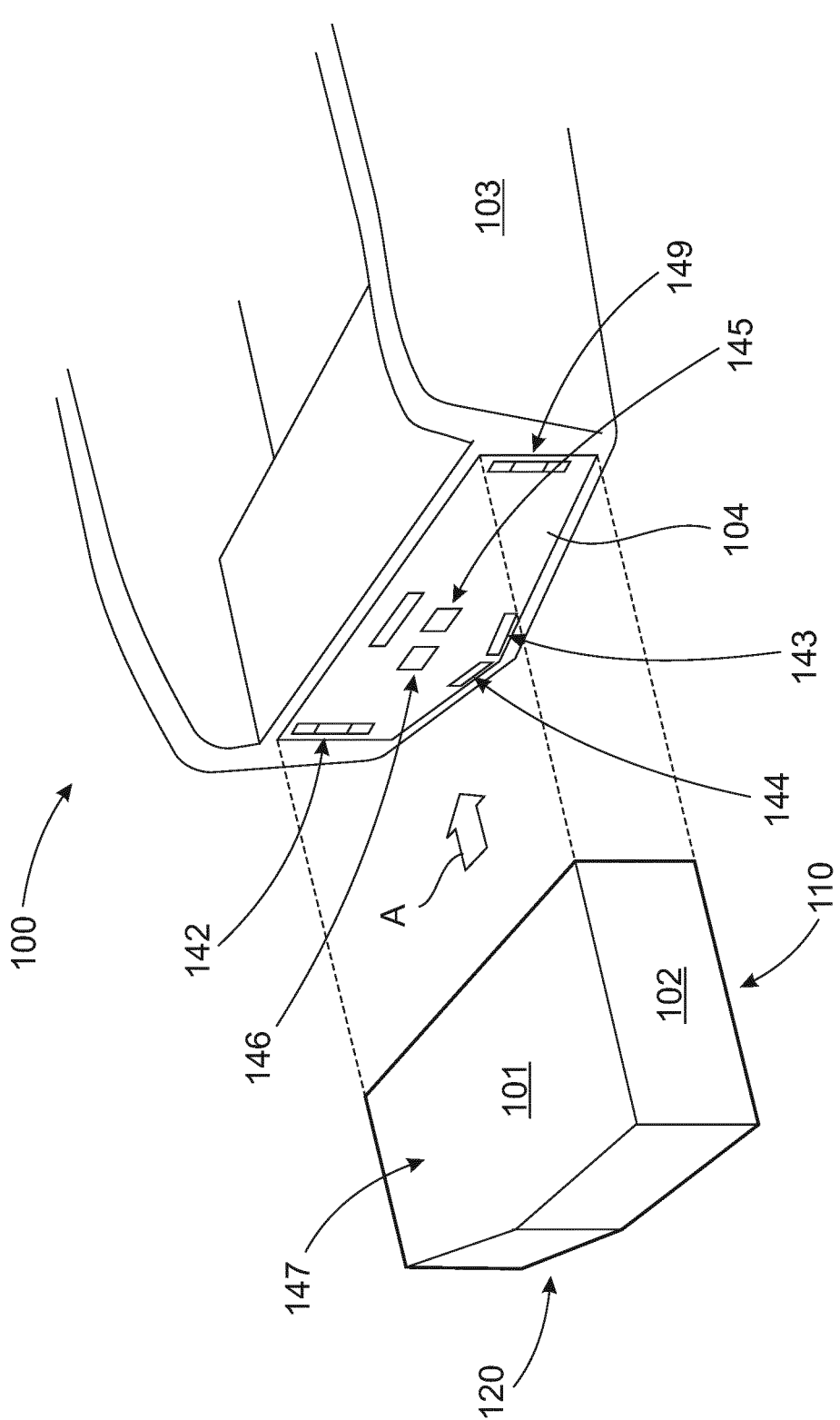
FIG. 2 shows a schematically illustrated detachable auxiliary hull unit.

FIG. 2 shows a schematically illustrated detachable auxiliary hull unit 101 according to the invention. The auxiliary hull unit 101 is detachably mounted to a transom 104 on a marine vessel 100, wherein the hull unit 101 is mounted at least partially below the water line of the vessel. FIG. 2 shows the hydrofoils 110, 120 in their stowed position. Opposite sides 102 of the auxiliary hull unit 101 are arranged to extend rearwards parallel to the rearward extension of vessel hull sections 103 adjacent to the hull unit. The transom 104 is provided with multiple attachment points 141, 142, 143, 144 for detachable mounting of the auxiliary hull unit 101, as indicated by the arrow A. The transom 104 is further provided with an opening 145 for control cables connected between the auxiliary hull unit 101 and control means (not shown) allowing an operator to deploy and retract the hydrofoils. An optional opening 146 for connecting the auxiliary hull unit 101 to a power storage or a fuel tank can also be provided. Preferably the auxiliary hull unit 101 comprises a self-contained power source 145 (not shown) including a power storage, such as a battery, a fuel cell or similar.

Figure 3:
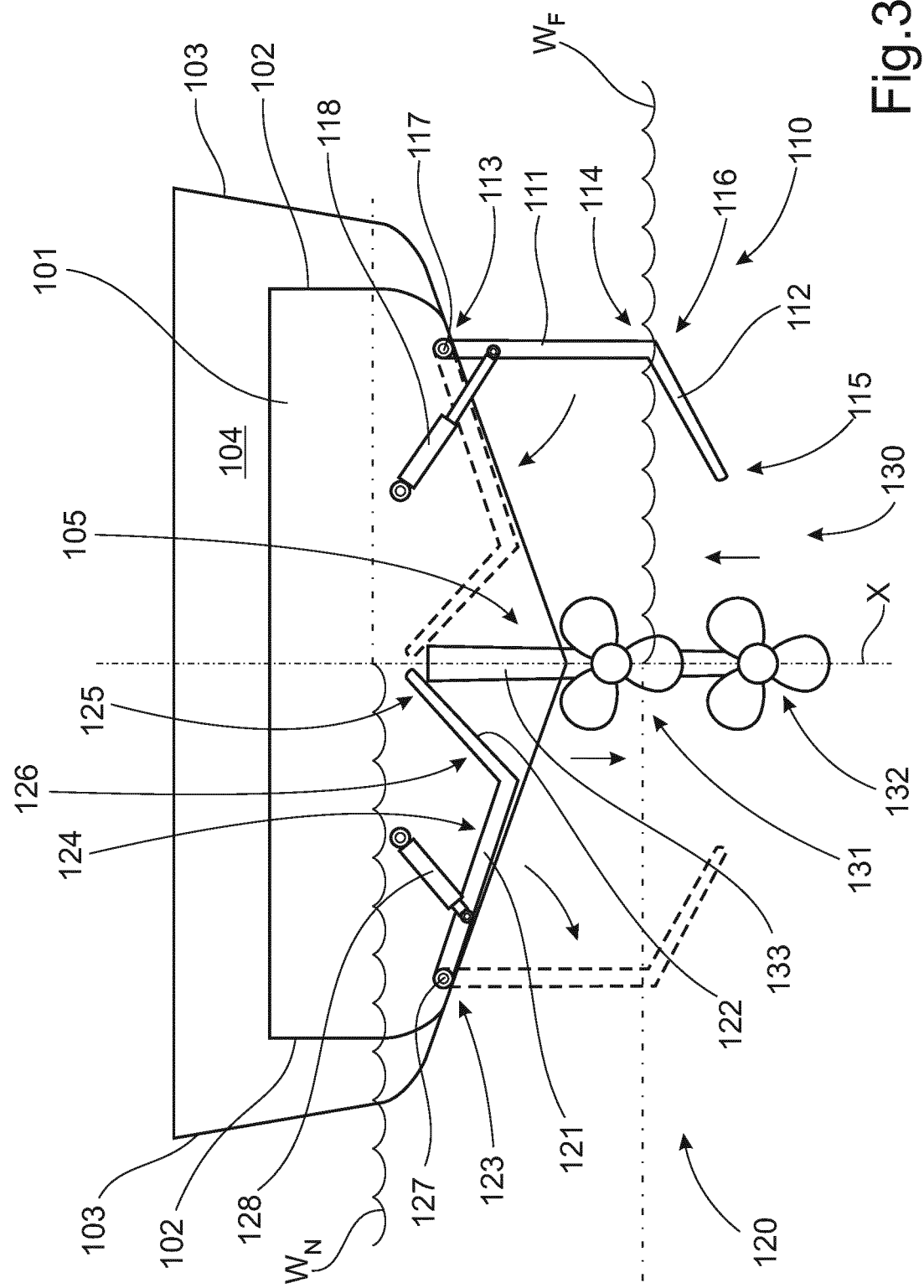
FIG. 3 shows a schematic rear view illustration of a hydrofoil system according to a first example.

FIG. 3 shows a schematic rear view illustration of a hydrofoil system according to a first example. The left-hand side of FIG. 3 shows a hydrofoil 120 in the stowed position, while the right-hand side shows a hydrofoil 110 in the deployed position. The left-hand side of FIG. 3 shows the hydrofoil 120 comprising a first portion 121 comprising a first end 123, which first end is mounted by a hinge 127 relative to a side 102 of the hull unit 101. The stowed hydrofoil 120 further comprises a second portion 122 comprising a free second end 125 extending away from the first portion 121 towards the opposite side of the hull unit 101 and at an obtuse angle relative to the first portion. This angle is formed at the point where the second end 124 of the first portion 121 and the first end 126 of the second portion 122 are joined. The folded hydrofoil 120 is at least flush with the hull unit 101 in the stowed position. An actuator 128 is provided for displacement of the hydrofoil 120 towards its deployed position (shown in dashed lines). A propulsion unit comprising a propeller 131 and an extendable leg 133 is also provided. The left-hand side of FIG. 3 shows the hull 103 of the vessel relative to the normal water level $W_H$, where the propulsion unit is in its retracted position.

Referring to the stowed hydrofoil 120, the first portion 121 of the hydrofoil 120 extends adjacent the hull unit 101 along its entire length when the hydrofoil 120 is in the stowed position. The second portion 122 of the hydrofoil 120 is arranged to extend into a lateral cavity 105 in the hull unit 101 when the hydrofoil is in the stowed position. In this example, the second portion 122 of the hydrofoil is arranged to extend inwards and upwards into the lateral cavity 105 in the hull unit 101 when in the stowed position. In addition, the free second end 125 of the second portion 120 is arranged to extend up to a vertical plane X through the longitudinal axis of the hull unit 101 when the hydrofoil is in the stowed position. In this way the hydrofoils can be deployed and retracted simultaneously, as they do not interfere with each other. Hydrofoils according to this example can be suited for smaller and/or relatively light vessels, requiring a correspondingly smaller lifting force to make the hull clear the surface of the water.

The right-hand side of FIG. 3 shows a hydrofoil 110 in the deployed position. The right-hand side of FIG. 3 shows the hydrofoil 110 comprising a first portion 111 comprising a first end 113 which first ends are mounted by a hinge 117 relative to a side 102 of the hull unit 101. The stowed hydrofoil 110 further comprises a second portion 112 comprising a free second end 115 extending away from the first portion 111 downwards into the water and at an obtuse angle relative to the first portion. The second portion 112 forms a foiling portion with a wing shaped cross-section that provides a lifting force for the hull unit 101. An actuator 118 is provided for displacement of the hydrofoil 110 towards its retracted position (shown in dashed lines). A propulsion unit comprising a propeller 132 and an extendable leg 133 is also provided. The right-hand side of FIG. 3 shows the hull 103 of the vessel relative to the foiling water level $W_F$, where the propulsion unit is in its extended position.

According to the example in FIG. 3, at least the side portions 102 of the auxiliary hull unit 101 are arranged as an inward step relative to the side portions of the hull 103 of the vessel adjacent the transom 104. The inward step will extend along the entire length of the auxiliary hull unit 101. The recessed depth of the step can be at least equal to the thickness of the first portion of the corresponding hydrofoil in its stowed position, whereby drag can be eliminated or at least significantly reduced for the part of the first portion of the hydrofoil that extends below the waterline when the vessel is travelling at low or planing speeds. Alternatively, such an inward step can be provided in the side portions of the auxiliary hull unit itself. The inward step will extend along the remaining rearward length of the auxiliary hull unit. This option can be used when the foldable hydrofoils are located at a position in the hull unit remote from the transom of the vessel. The lateral cavity 105 is arranged to extend into the bottom or lower hull portion of the auxiliary hull unit 101 below the waterline. In order to avoid a forward facing, drag inducing surface, the lateral cavity 101 can open up gradually or completely in the rearward direction of the hull unit. The cavity for the second portions of the hydrofoils is always located in the lateral direction of the inwards step in the hull unit.

Figure 4:
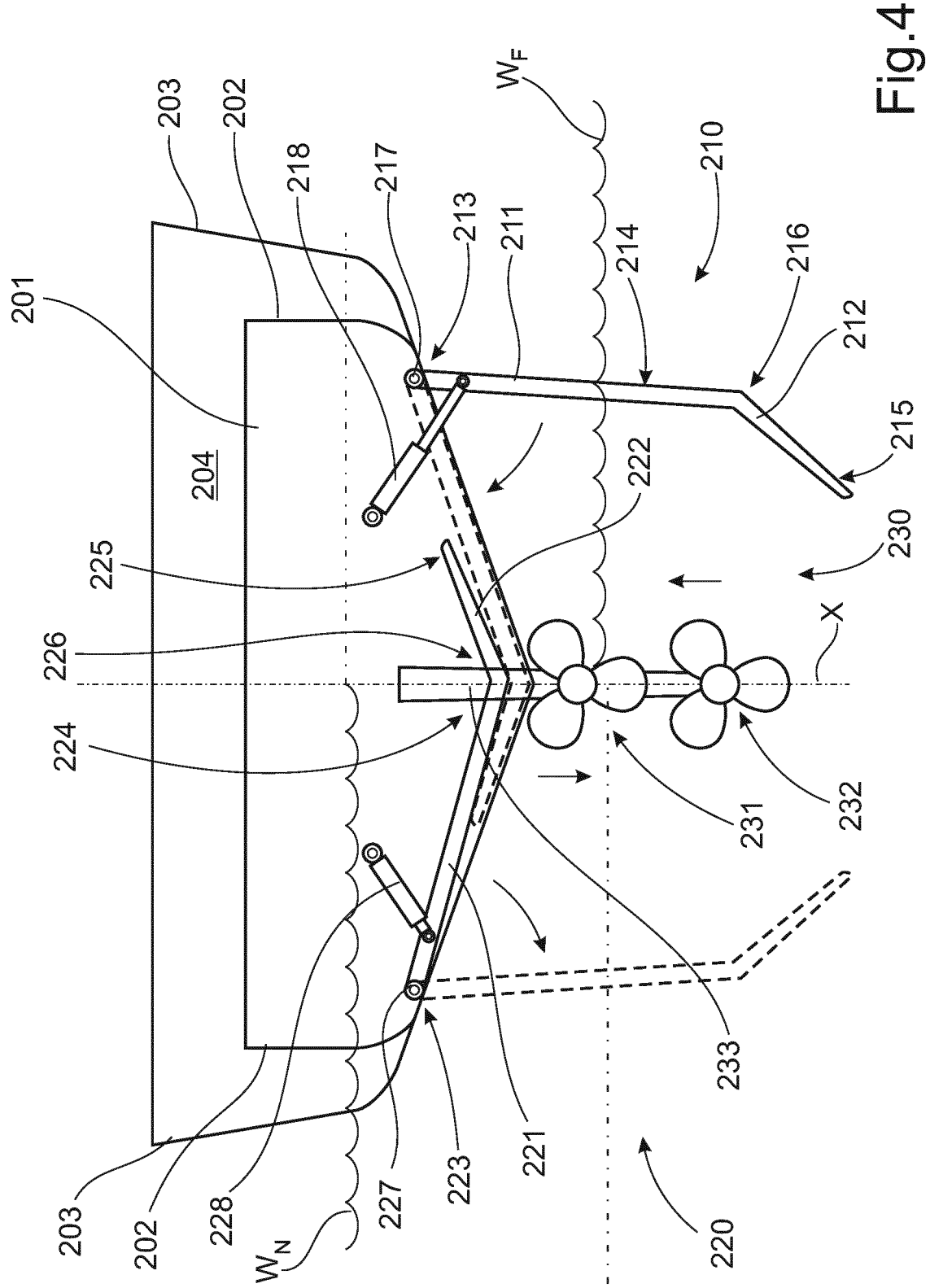
FIG. 4 shows a schematic rear view illustration of a hydrofoil system according to a second example.

FIG. 4 shows a schematic rear view illustration of a hydrofoil system according to a second example. The left-hand side of FIG. 4 shows a hydrofoil 220 in the stowed position, while the right-hand side shows a hydrofoil 210 in the deployed position. The left-hand side of FIG. 4 shows the hydrofoil 220 comprising a first portion 221 comprising a first end 223, which first end is mounted by a hinge 227 relative to a side 202 of the hull unit 201. The first portion 221 of the hydrofoil extending adjacent the hull unit up to the central longitudinal axis X of the hull unit 201 when the hydrofoil is in the stowed position. The stowed hydrofoil 220 further comprises a second portion 222 comprising a free second end 225 extending away from the first portion 121 a predetermined distance past the central longitudinal axis X of the hull unit, and at an obtuse angle relative to the first portion 221. This angle is formed at the point where the second end 224 of the first portion 221 and the first end 226 of the second portion 222 are joined. The folded hydrofoil 220 is at least flush with the hull unit 201 in the stowed position. An actuator 228 is provided for displacement of the hydrofoil 120 towards its deployed position (shown in dashed lines). A propulsion unit comprising a propeller 231 and an extendable leg 233 is also provided. The left-hand side of FIG. 4 shows the hull 203 of the vessel relative to the normal water level $W_H$, where the propulsion unit is in its retracted position. Hydrofoils according to this example are suited for larger and/or relatively heavy vessels, requiring a correspondingly larger lifting force to make the hull clear the surface of the water.

The right-hand side of FIG. 4 shows a hydrofoil 210 in the deployed position. The right-hand side of FIG. 4 shows the hydrofoil 210 comprising a first portion 211 comprising a first end 213 which first ends are mounted by a hinge 217 relative to a side 202 of the hull unit 201. The deployed hydrofoil 210 further comprises a second portion 212 comprising a free second end 215 extending away from the first portion 211 downwards into the water and at an obtuse angle relative to the first portion. The second portion 212 forms a foiling portion with a wing shaped cross-section that provides a lifting force for the hull unit 201. An actuator 218 is provided for displacement of the hydrofoil 210 towards its retracted position (shown in dashed lines). A propulsion unit comprising a propeller 232 and an extendable leg 233 is also provided. The right-hand side of FIG. 4 shows the hull 203 of the vessel relative to the foiling water level $W_F$, where the propulsion unit is in its extended position.

According to the example in FIG. 4, at least the side portions 202 of the auxiliary hull unit 201 can be arranged as an inward step relative to the side portions of the hull 203 of the vessel adjacent the transom 204. The inward step will extend along the entire length of the auxiliary hull unit 201. The recessed depth of the step can be at least equal to the combined thickness of the overlapping portions of the hydrofoils in their stowed positions, whereby drag can be eliminated or at least significantly reduced for the part of the first portion of the hydrofoil that extends below the waterline when the vessel is travelling at low or planing speeds. Alternatively, such an inward step can be provided in the side portions of the auxiliary hull unit itself. The inward step will extend along the remaining rearward length of the auxiliary hull unit. This option can be used when the foldable hydrofoils are located at a position in the hull unit remote from the transom of the vessel.

According to the preferred example shown in FIG. 4, each pair of hydrofoils 210, 220 is arranged to overlap in the lateral direction of the hull unit 201 when the hydrofoils are in the stowed position. In the stowed position, the first hydrofoil 220 will extend adjacent the hull unit along its entire extension while the opposite, second hydrofoil 210 will extend partially adjacent the hull unit 201 and partially adjacent the second portion 222 and a part of the first portion 221 of the first hydrofoil 220. In this example, the overlapping first and second hydrofoils 210, 220 are arranged to be displaced in a predetermined order. During deployment, the overlapping hydrofoils are arranged to be displaced sequentially when moved towards their operative positions, wherein the outermost hydrofoil 210 is actuated first. During retraction of the hydrofoils 210, 220 towards their stowed positions the hydrofoils are actuated in reverse, wherein the innermost hydrofoil 220 is actuated first. In addition, the lower part of the hull unit, where the first and second hydrofoils the hull unit are arranged to overlap on either side of the longitudinal axis of the unit, will require a deeper inward step in order to accommodate the overlapping foil portions. This deeper recessed inward step will extend along the remaining rearward length of the auxiliary hull unit.

According to a further example (not shown), each pair of hydrofoils can be arranged side-by-side in the lateral direction of the hull unit when the hydrofoils are in the stowed position. Hence, a first hydrofoil is positioned in front of a second hydrofoil in the longitudinal direction of the auxiliary hull unit. In this example, the longitudinally offset hydrofoils are arranged to be displaced simultaneously when moved towards the deployed position. Here, at least the side portions of the auxiliary hull unit can be arranged as an inward step relative to the side portions of the hull of the vessel adjacent the transom. The inward step will extend along the entire length of the auxiliary hull unit. The depth of the step can be at least equal to the thickness of the first and second portions of the hydrofoils in their stowed positions, whereby drag can be eliminated or at least significantly reduced for the part of the first portion of the hydrofoil that extends below the waterline when the vessel is travelling at low or planing speeds. Alternatively, such an inward step can be provided in the side portions of the auxiliary hull unit itself. The inward step will extend along the remaining rearward length of the auxiliary hull unit. This option can be used when the foldable hydrofoils are located at a position in the hull unit remote from the transom of the vessel. If desired, the inward step on one side of the auxiliary unit can be offset in the longitudinal direction of the vessel, in order to conform to the corresponding offset of the rear second hydrofoil.

In the latter example where the stowed hydrofoils are side-by-side adjacent the hull, the first ends of both foldable hydrofoils can comprise a hinge having a pivot axis extending in the horizontal plane in the longitudinal direction of the marine vessel. When these hydrofoils are deployed, the submerged second ends of each hydrofoil will be offset in the longitudinal direction of the vessel when each hydrofoil reaches its operative position. As the hydrofoils are deployed non-symmetrically, or offset in the lateral direction, a moment is generated about the center of gravity of the vessel. This moment will require a steering correction in order to maintain the vessel on a straight heading.

Figure 5:
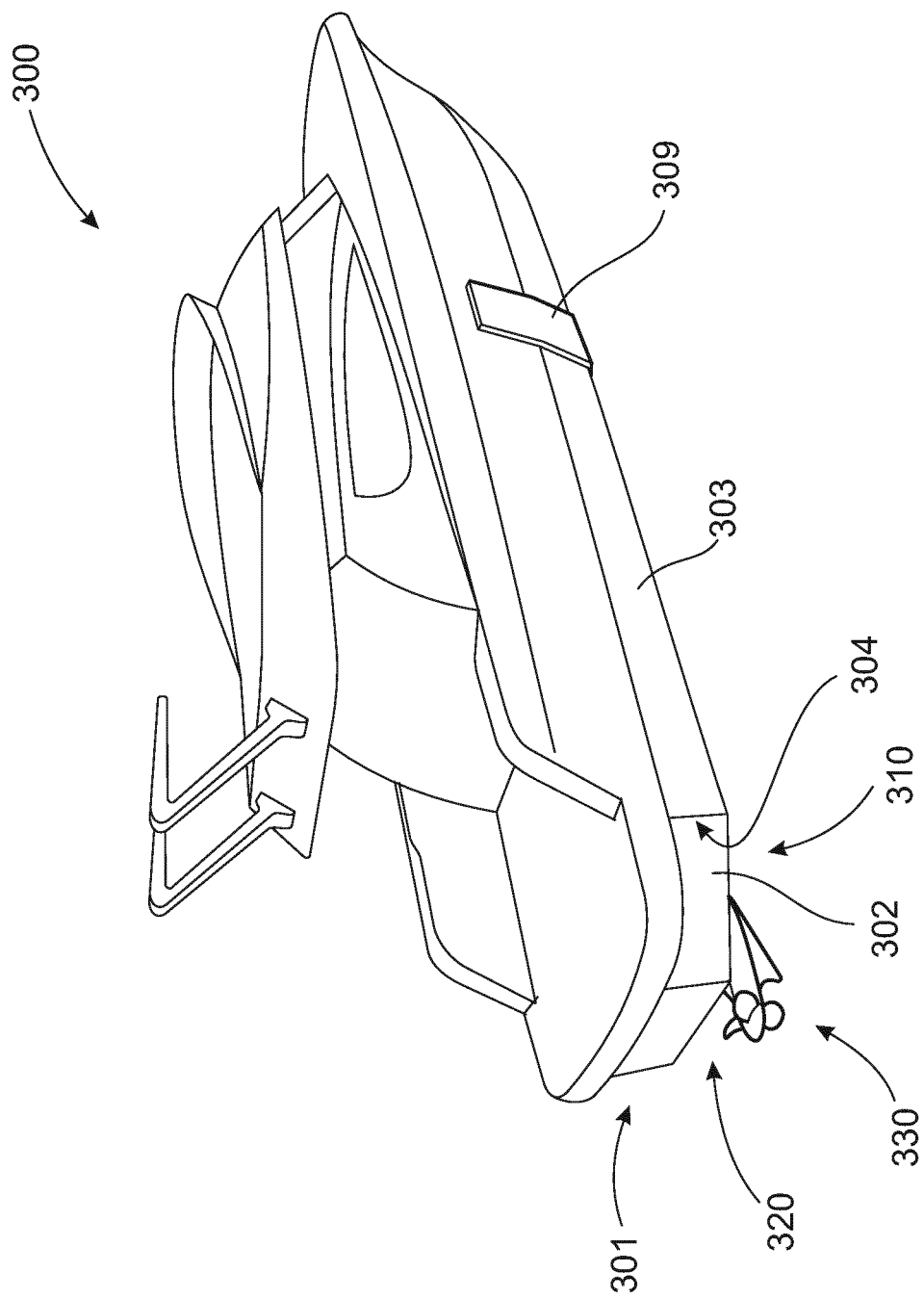
FIG. 5 shows a perspective view of a schematically illustrated vessel comprising an auxiliary hull unit with a propulsion unit according to the invention.

FIG. 5 shows a perspective view of a schematically illustrated vessel 300 comprising a detachable auxiliary hull unit 301 and a propulsion unit 330 according to the invention. According to this example the auxiliary hull unit 301 is provided with a propulsion unit comprising an electric motor in the form of a pod 301. The propulsion unit 301 is arranged to be vertically displaceable between a stowed, first position and a deployed, second position (see FIG. 6). In the stowed position the propulsion unit is used for travelling at low or planing speeds, while the deployed position is used for position for operation at foiling speeds. The auxiliary hull unit can comprise an internal a power storage connected to the pod propulsion unit or a power storage located on-board the marine vessel to which the hull unit is mounted. FIG. 5 shows the auxiliary hull unit 301 attached to the transom 304 of the vessel 300, wherein the sides 302 of the auxiliary hull unit 301 are flush with the sides of the hull 303 of the vessel 300. The figure also indicates a pair of main hydrofoils 309 mounted to the hull 303 of the vessel and a pair of rear hydrofoils 310, 320 mounted to the auxiliary hull unit 301. In FIG. 5 all hydrofoils are in their stowed positions.

Figure 6:
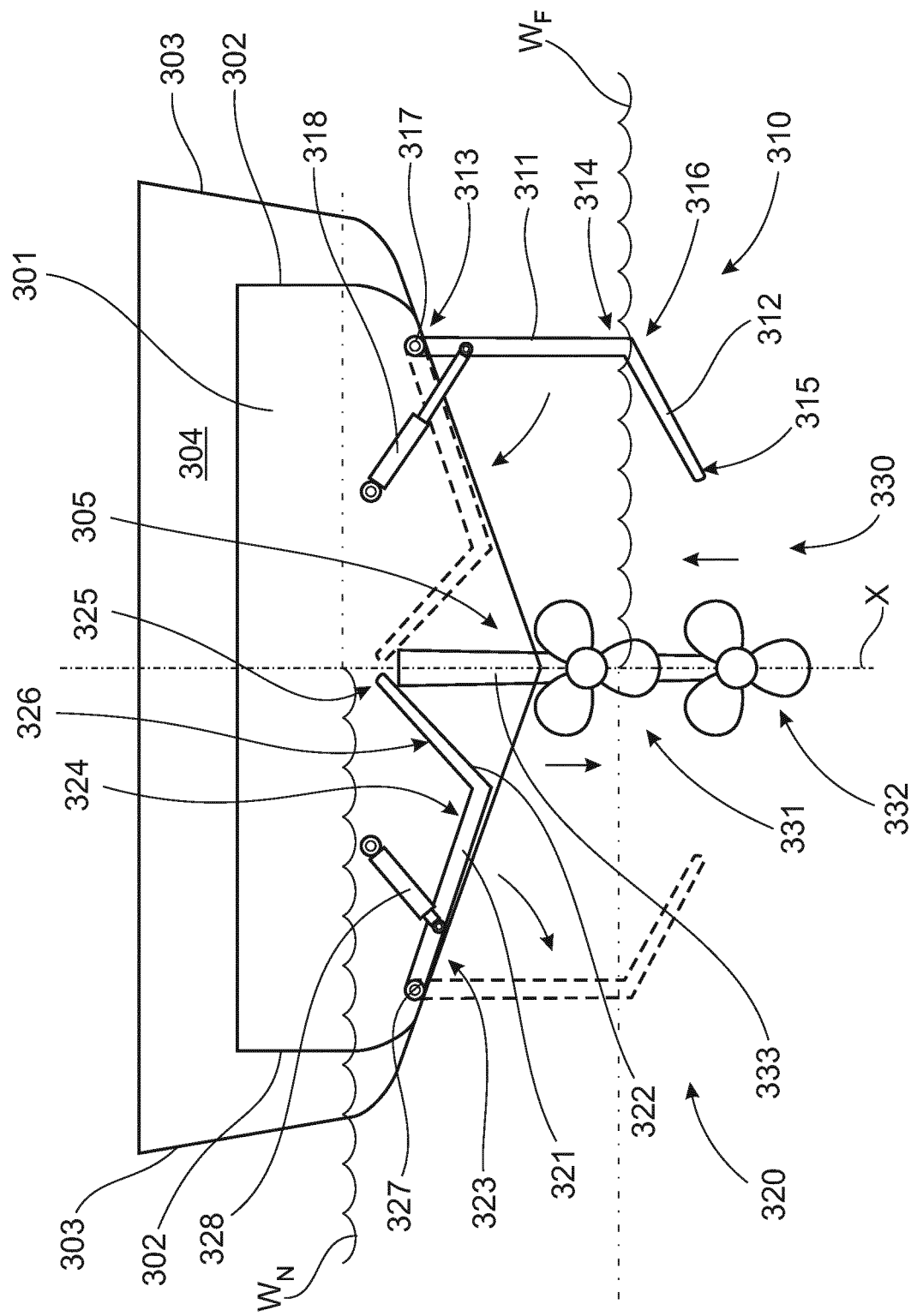
FIG. 6 shows a schematic rear view illustration of an auxiliary hull unit comprising a propulsion unit according to a first example.

FIG. 6 shows a schematic rear view illustration of a propulsion unit 331, 332, 333 for use in an auxiliary hull unit 301 according to the invention. The propulsion unit can be displaced between a retracted first position 331 and a deployed second position 332 by means of a suitable mechanism 322 controlled by one or more actuators (see FIG. 7A). According to one example, a single or double pivoted parallel arm linkage can be arranged to support the propulsion unit and displace it between the stowed and the deployed positions by means of one or more actuators mounted in line with or on either side of the propulsion unit. According to an alternative example, the propulsion unit can be displaced by means of a substantially vertical guide or rail onto which the propulsion unit is slidably mounted. Such displacement solutions are suitable for both internal combustion engines propulsion units as well as electric propulsion units such as electric pod drives. In this example, one or more controllable actuators can be used to perform a linear displacement of the propulsion unit between the stowed and the deployed positions. Suitable actuators for this purpose can be hydraulically or electrically powered actuators. According to a further example, the at least one propulsion unit can be displaced between the first and second positions by means of an electrically or hydraulically operated telescoping arrangement. This solution is suitable for propulsion units such as electric pod drives, since no mechanical transmission is required through an extendable, telescoping leg supporting an electric pod drive. Power for operating the one or more controllable actuators is preferably provided from a self-contained power source and/or power storage within the auxiliary hull unit.

The propulsion unit and the actuators are located in a lower cavity 305 that opens up into the auxiliary hull unit 301 from below and extend rearwards from an attachment point for the propulsion unit 331, 333. The cavity 305 can extend partially or entirely through the longitudinal rearward extension of the hull unit 301. The auxiliary hull unit preferably comprises an internal source of power and/or power storage (see FIG. 8) that is located in a watertight compartment within the hull unit 301 and connected to the propulsion unit. Alternatively, the hull unit can also be connected to a power storage (not shown) located on-board the marine vessel to which the hull unit 301 is mounted. The internal power storage can be a rechargeable battery pack for relatively short distance travel, or fuel cells for travelling longer distances. One or more battery packs or fuel tanks for alternative fuels can be distributed within the auxiliary hull unit to achieve an optimal weight distribution. When battery packs with a limited range are provided for driving the at least one propulsion unit, it can be an option to provide a small combustion engine or generator to be used as a hybrid range extender. In the case of fuel cells operated using hydrogen, it may be required to provide hydrogen tanks on-board the marine vessel due to the space occupied by such tanks.

FIG. 6 further shows the auxiliary hull unit 301 and the propulsion unit 331, 333 combined with a pair of foldable hydrofoils 310, 320, of the type described in FIG. 3. The deployable hydrofoils 310, 320 are provided in front of the propulsion unit 331, 333 in the auxiliary hull unit 301. In this way, deployment of the hydrofoils does not interfere with the deployment of the one or more extendable propulsion units. The left-hand side of FIG. 6 shows a hydrofoil 320 in the stowed position, while the right-hand side shows a hydrofoil 310 in the deployed position. The left-hand side of FIG. 6 shows the hydrofoil 320 comprising a first portion 321 comprising a first end 323, which first end is mounted by a hinge 327 relative to a side 302 of the hull unit 301. The stowed hydrofoil 320 further comprises a second portion 322 comprising a free second end 325 extending away from the first portion 321 towards the opposite side of the hull unit 301 and at an obtuse angle relative to the first portion. This angle is formed at the point where the second end 324 of the first portion 321 and the first end 326 of the second portion 322 are joined. The folded hydrofoil 320 is at least flush with the hull unit 301 in the stowed position. An actuator 328 is provided for displacement of the hydrofoil 320 towards its deployed position (shown in dashed lines). A propulsion unit comprising a propeller 331 and an extendable leg 333 is also provided. The left-hand side of FIG. 6 shows the hull 303 of the vessel relative to the normal water level $W_H$, where the propulsion unit is in its retracted position. Referring to the stowed hydrofoil 320, the first portion 321 of the hydrofoil 320 extends adjacent the hull unit 301 along its entire length when the hydrofoil 320 is in the stowed position. The second portion 322 of the hydrofoil 320 is arranged to extend into a lateral cavity 305 in the hull unit 301 when the hydrofoil is in the stowed position. In this example, the second portion 322 of the hydrofoil is arranged to extend inwards and upwards into the lateral cavity 305 in the hull unit 301 when in the stowed position. In addition, the free second end 325 of the second portion 320 is arranged to extend up to a vertical plane X through the longitudinal axis of the hull unit 301 when the hydrofoil is in the stowed position. In this way the hydrofoils can be deployed and retracted simultaneously, as they do not interfere with each other. Hydrofoils according to this example can be suited for smaller and/or relatively light vessels, requiring a correspondingly smaller lifting force to make the hull clear the surface of the water.

The right-hand side of FIG. 6 shows a hydrofoil 310 in the deployed position. The right-hand side of FIG. 6 shows the hydrofoil 310 comprising a first portion 311 comprising a first end 313 which first ends are mounted by a hinge 317 relative to a side 302 of the hull unit 301. The stowed hydrofoil 310 further comprises a second portion 312 comprising a free second end 315 extending away from the first portion 311 downwards into the water and at an obtuse angle relative to the first portion. The second portion 312 forms a foiling portion with a wing shaped cross-section that provides a lifting force for the hull unit 301. An actuator 318 is provided for displacement of the hydrofoil 310 towards its retracted position (shown in dashed lines). A propulsion unit comprising a propeller 332 and an extendable leg 333 is also provided. The right-hand side of FIG. 6 shows the hull 303 of the vessel relative to the foiling water level $W_F$, where the propulsion unit is in its extended position.

According to the example in FIG. 6, the side portions 302 of the auxiliary hull unit 301 are arranged as an inward step relative to the side portions of the hull 303 of the vessel adjacent the transom 304. The inward step will extend along the entire length of the auxiliary hull unit 301. The recessed depth of the step can be at least equal to the thickness of the first portion of the corresponding hydrofoil in its stowed position, whereby drag can be eliminated or at least significantly reduced for the part of the first portion of the hydrofoil that extends below the waterline when the vessel is travelling at low or planing speeds. Alternatively, such an inward step can be provided in the side portions of the auxiliary hull unit itself. The inward step will extend along the remaining rearward length of the auxiliary hull unit. This option can be used when the foldable hydrofoils are located at a position in the hull unit remote from the transom of the vessel. The lateral cavity 305 is arranged to extend into the bottom or lower hull portion of the auxiliary hull unit 301 below the waterline. In order to avoid a forward facing, drag inducing surface, the lateral cavity 301 can open up gradually or completely in the rearward direction of the hull unit. The cavity for the second portions of the hydrofoils is located in the lateral direction of the inwards step in the hull unit.

According to a further alternative example, the auxiliary hull unit and the propulsion unit can also be combined with a hydrofoil system according to FIG. 4.

FIGS. 7A and 7B show a schematic side view of an auxiliary hull unit 401 comprising a deployable propulsion unit 430 according to a second example. FIG. 7A shows the propulsion unit 430 in its retracted position in a cavity 405 in the auxiliary hull unit 401. In this example, the propulsion unit is an ICE connected via a transmission to a dual counter-rotating propeller arrangement 431. The auxiliary hull unit 401 is partially submerged in the water as indicated by the normal water level $W_H$ and a rear hydrofoil 410 attached to the auxiliary hull unit 401 in front of the propulsion unit 430 is in its stowed position. The propulsion unit 430 is mounted to the auxiliary hull unit 401 by a controllable parallel linkage arrangement 440, comprising an upper, first arm 441 and a lower, second arm 442. The parallel linkage arrangement 440 is attached to a support 443 mounted on a rearward facing wall 406 in the cavity 405. The support 443 comprises a fixed portion mounted on the wall 406 and a pivoting portion (not shown) allowing the propulsion unit 430 to be steered. The first arm 441 is attached to the propulsion unit 430 at a first end 444 and to the support 443 at a second end 445. The second arm 442 is attached to the propulsion unit 430 at a first end 446 and to the support 443 at a second end 447. The first and second arms 441, 442 are further connected to the support 443 by individual actuators 448, 449, attached to the respective first and second arms 441, 442 intermediate their ends. The parallel linkage arrangement 440 is attached to the pivotable portion of the support 443 on the rearward facing wall 406 in the cavity 405 in order to allow the propulsion unit 430 to be pivoted about a substantially vertical axis (not shown). This allows an operator to pivot the propulsion unit 430 and steer the vessel to a desired heading by means of controllable actuators (not shown) attached to the cavity wall 406 and acting on the pivoting portion of the support 443 or directly on the propulsion unit 430.

The example in FIG. 7A relates to a propulsion unit displaced by a parallel linkage. Alternatively, the propulsion unit can be displaced by means of a substantially vertical guide or rail onto which the propulsion unit is slidably mounted, or by an electrically or hydraulically operated telescoping arrangement. The arrangement in FIG. 7A is used for displacement of an ICE, but it is also applicable to an electric propulsion unit or an electrically operated pod attached to an extendable or telescoping leg.

FIG. 7B shows the propulsion unit 430 in its deployed position, extended partially out of cavity 405 in the auxiliary hull unit 401. The hydrofoil 410 (one shown) attached to the auxiliary hull unit 401 in front of the propulsion unit 430 is also shown in its deployed position, extending into the water indicated by the foiling water level $W_F$. In FIG. 7B, individual actuators 448, 449, attached to the respective first and second arms 441, 442 have been extended. This operation causes the first and second arms 441, 442 to pivot about their respective second ends 445, 447, thereby lowering the propulsion unit 430 to its deployed position for foiling operation. Similarly, retraction of the actuators 448, 449 causes a retraction of the propulsion unit 430 for low speed or planning operation.

Figure 8:
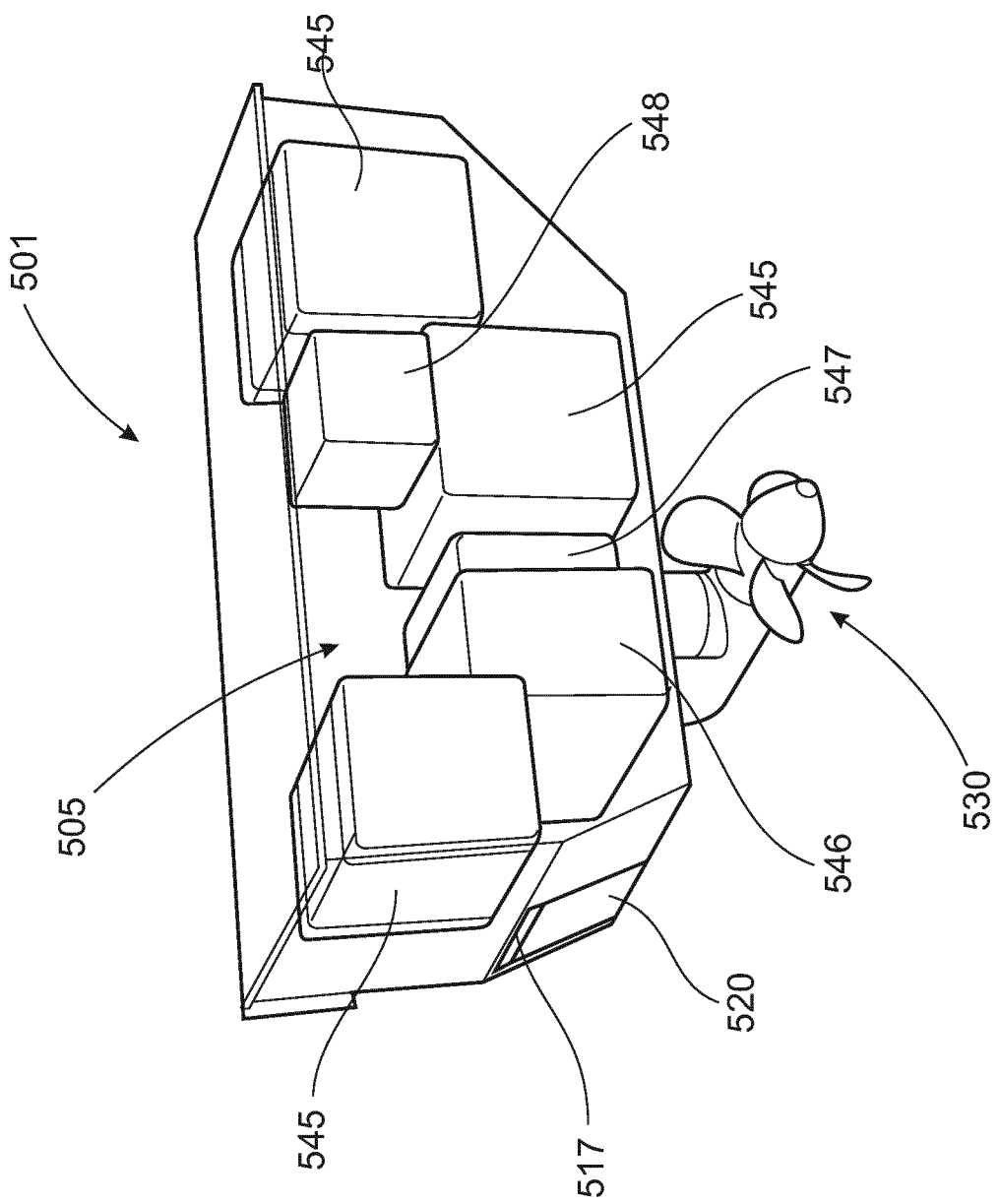
FIG. 8 shows a perspective view of an auxiliary hull unit according to a further example.

FIG. 8 shows a perspective view of an auxiliary hull unit according to a further example. This figure comprises a cutaway drawing showing one non-limiting example of the internal component parts of an auxiliary hull unit 501 according to the invention. The auxiliary hull unit 501 in this example is provided with a propulsion unit 530 in the form of an electric pod that is extendable out of a cavity (indicated by "505") in a lower portion of the auxiliary hull unit 501. A foldable hydrofoil 520 (one shown), attached to the auxiliary hull unit 501 by a hinge 517, is shown in its stowed position. External components, such as the propulsion unit 530 and actuators (not shown) for extending or retracting the propulsion unit are exposed to the environment. Internal component parts are located in a sealed, watertight compartment where they can be protected from the corrosive marine environment. FIG. 8 shows an example of a self-contained auxiliary hull unit 501, which comprises multiple power storage units 545, a hydraulics unit 546, a control unit 547 for the hydraulics unit and an electronic control unit (ECU) 548 for the electrical components. This example shows an arrangement with three power storage units 545 in the form of battery packs. The use of multiple battery packs facilitates packing of the batteries in the auxiliary hull unit 501 and provides redundancy in case of a failure of one battery pack. The hydraulics unit 546 can comprise a pump, a hydraulic circuit, an optional accumulator and controllable valves, all connected to hydraulic actuators used for deploying and retracting the propulsion unit 530 and the hydrofoils 420. The components in the hydraulics unit 546 are controlled by the hydraulics control unit 547, which are in turn controlled by an operator via suitable wiring from the auxiliary hull unit 501 to an operator position on-board the marine vessel onto which the hull unit is attached. The electric propulsion unit 530 is controlled by the ECU 548, which comprises power electronics and electrical circuits for monitoring and controlling the battery packs. The ECU is also controlled by an operator via suitable wiring from the auxiliary hull unit 501 to an operator position on-board the marine vessel. Hence, when the auxiliary hull unit 501 is attached to a vessel by suitable fastening means, the only additional connection to the vessel comprises electrical connectors and the electrical wiring for controlling the propulsion unit and the hydrofoils. Electrical connectors for the electrical wiring having a suitable IP-classification are well known in the field of marine vessels and will not be described in detail.

The component parts enclosed within the auxiliary hull unit 501 can be exchanged or adapted during manufacture in order to adapt the unit to the type of propulsion unit, power source and/or power storage desired. The internal power storage can be a rechargeable battery pack for relatively short distance travel, or fuel cells for travelling longer distances. One or more battery packs or fuel tanks for alternative fuels can be distributed within the auxiliary hull unit to achieve an optimal weight distribution. When battery packs with a limited range are provided for driving the at least one propulsion unit, it can be an option to provide a small combustion engine or generator to be used as a hybrid range extender. In the case of fuel cells operated using hydrogen, it may be required to provide hydrogen tanks on-board the marine vessel due to the space occupied by such tanks. Alternatively, the hull unit can also be connected to a power storage (not shown) located on-board the marine vessel to which the hull unit 301 is mounted. Such an arrangement will require additional connectors and conduits between the vessel and the hull unit.

Figure 9:
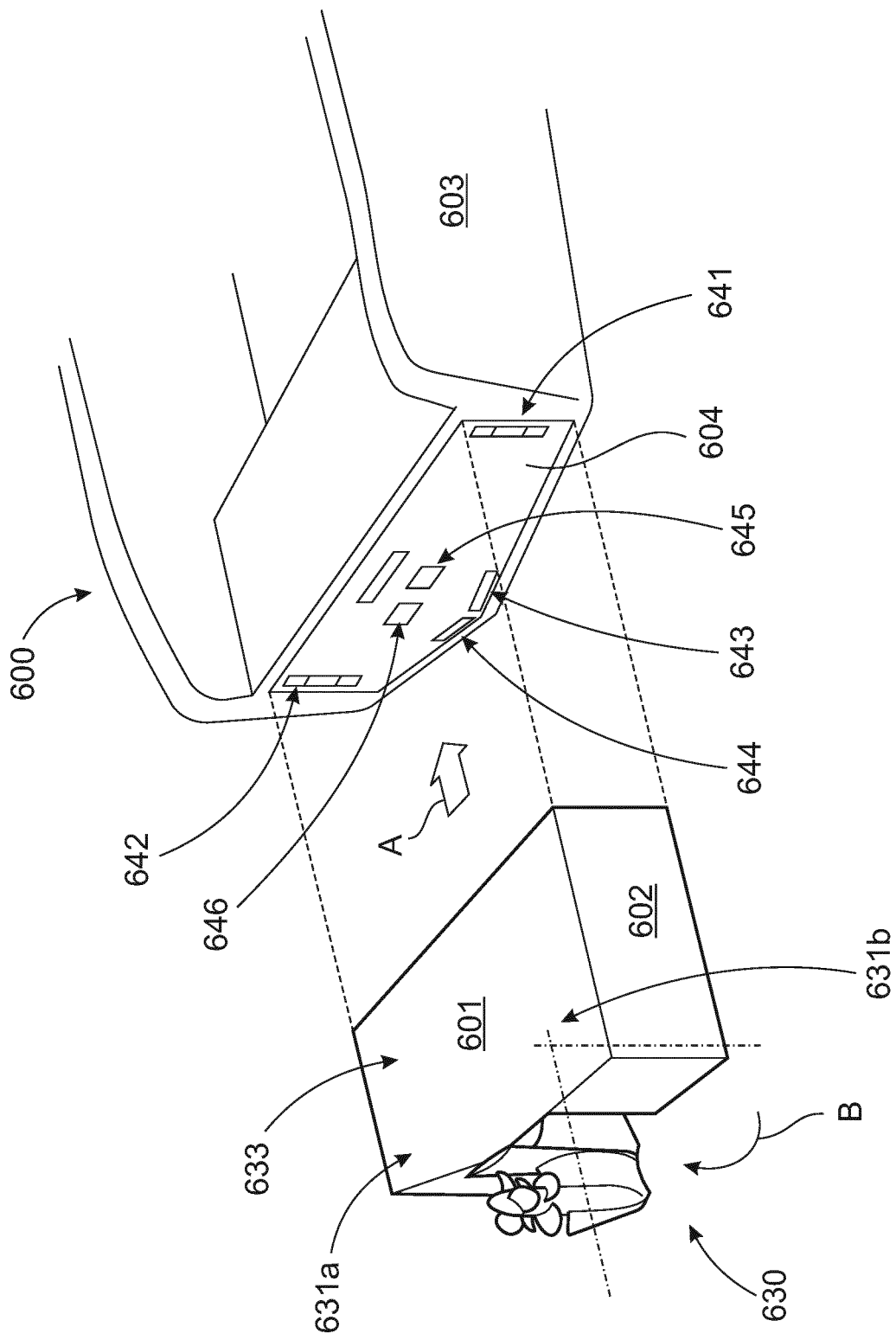
FIG. 9 shows a schematically illustrated detachable auxiliary hull unit with a folding propulsion unit.

FIG. 9 shows a schematically illustrated detachable auxiliary hull unit with a folding propulsion unit. According to a first example, an auxiliary hull unit 601 is detachably mounted to a transom 604 on a marine vessel 600, wherein the hull unit 601 is mounted at least partially below the water line of the vessel. The figure further shows a folding propulsion unit 630 in a lifted, inactive position. Opposite sides 602 of the auxiliary hull unit 601 are arranged to extend rearwards parallel to the rearward extension of vessel hull sections 603 adjacent to the hull unit. The transom 604 is provided with multiple attachment points 641, 642, 643, 644 for detachable mounting of the auxiliary hull unit 601, as indicated by the arrow A. The transom 604 is further provided with an opening 645 for control cables connected between the auxiliary hull unit 601 and control means (not shown) allowing an operator to fold the propulsion unit 630 upwards, to an inactive position, or downwards, to an active, driving position. This folding action is indicated by the arrow B. The propulsion unit 630 is located in a central cavity 605 in the lower portion of the auxiliary hull unit 601, which cavity 605 opens up in the rearward direction of the hull unit 601. An optional opening 646 for connecting the auxiliary hull unit 601 to a power storage or a fuel tank can also be provided. Preferably the auxiliary hull unit 601 comprises a self-contained power source, such as electric motors 631a, 631b for the propulsion unit 630 and a power storage 633 (see FIG. 10), such as a battery, a fuel cell generating electric power, or similar.

Figure 10:
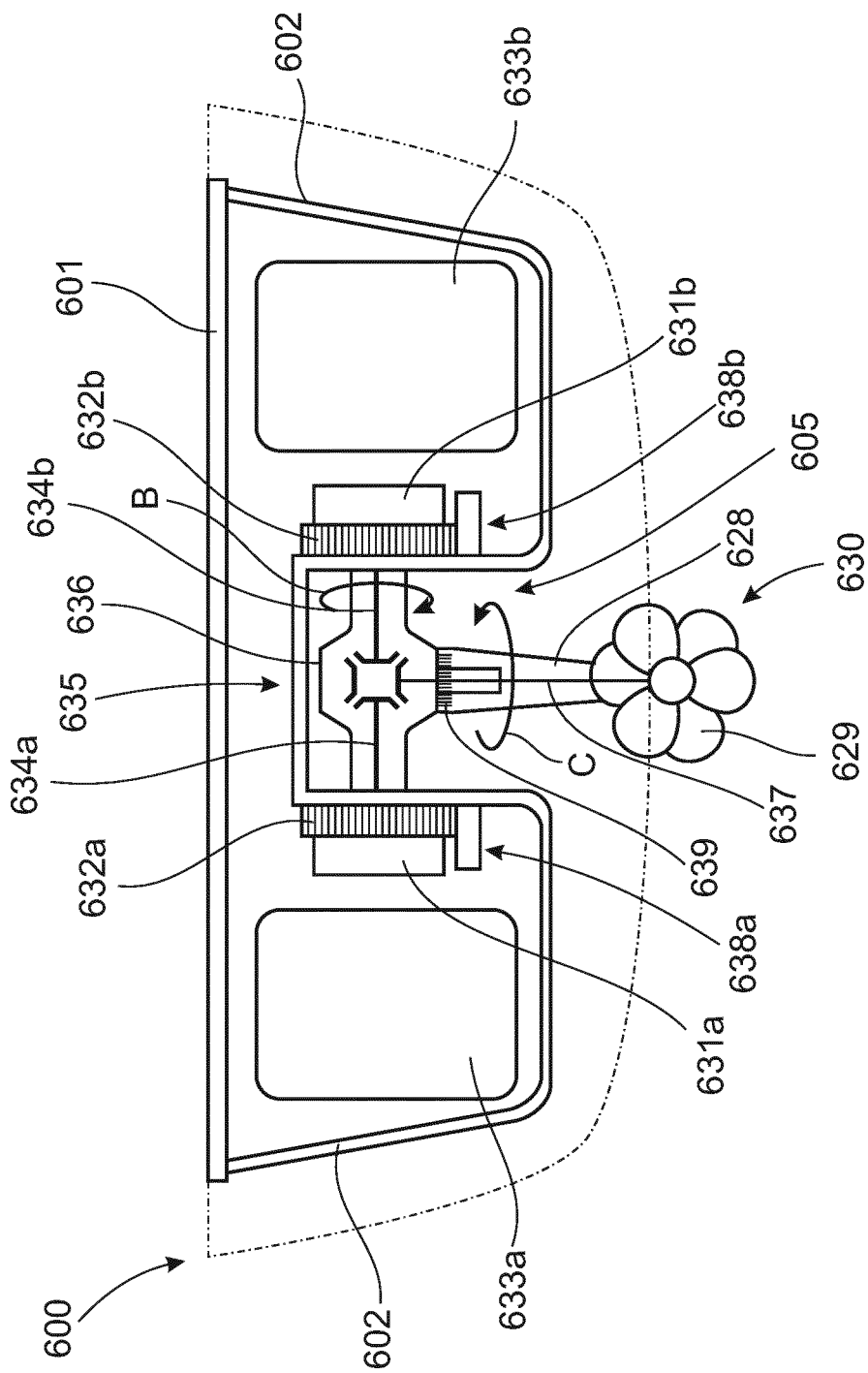
FIG. 10 shows a schematic rear view illustration of a folding propulsion unit according to a first example.

FIG. 10 shows a schematic rear view illustration of a folding propulsion unit according to the example in FIG. 9. In this first example, the auxiliary hull unit 601 is provided with a single folding propulsion unit 630 comprising two electric motors 631a, 631b that separately power a transmission for driving dual counter-rotating propellers 629. In this example, the electric motors 631a, 631b are identical and arranged on either side of the transmission with their output shafts arranged in the transverse direction of the auxiliary hull unit 601. The electric motors 631a, 631b have opposing output shafts each connected to the transmission via a first gearing 632a, 632b, comprising a reduction gear or a planetary gear. The electric motors 631a, 631b are powered by battery packs 633a, 633b. The electric motors 631a, 631b, the first gearing 632a, 632b and the battery packs 633a, 633b are located within a sealed, watertight compartment in the auxiliary hull unit 601. The respective first gearings 632a, 632b have opposing output shafts with concentric axes, which in this case are concentric with the output shafts of the electric motors.

Each first gearing 632a, 632b has an output shaft in the form of a horizontal shaft 634a, 634b extending into the central cavity 605 of the auxiliary hull unit 601, towards a common, central angular gearing 635. The central angular gearing 635 comprises bevel gears or a differential gear and is connected to a vertical shaft 637 extending through a vertical leg 628 down to a gearbox for the dual counter rotating propellers 629. The leg 628 forms a vertical housing enclosing the vertical shaft 637 and the gearbox for the counter-rotating propellers to support and protect the shafts and the gearing. The leg 628 and the shaft 637 are assumed to be vertical or near vertical when the propulsion unit 630 is in its driving position, as shown in FIG. 10. The horizontal shafts 634a, 634b and the central angular gearing 635 are enclosed in a horizontal housing 636 extending through the cavity 605. The horizontal housing 636 is rotatable relative to the horizontal shafts 634a, 634b and the central angular gearing 635 about the axis of rotation of said shafts. A controllable actuator 638a, 638b, such as an electric motor driving a gear wheel, is arranged adjacent each end of the horizontal housing 636 and can be actuated to rotate the housing 636 and the attached propulsion unit 630 between a lifted inactive position and a lowered driving position. This folding action is indicated by the arrow B. The arrangement allows the vertical leg 628 and the propellers 629 to be swung upwards and be lifted out of the water just like an outboard engine, in order to reduce corrosion and fouling.

The vertically extending housing of the leg 628 is attached to the horizontal housing 636 adjacent the central angular gearing 635 and is rotatable relative to the horizontal housing 636 about an axis coinciding with the axis of rotation of the vertical shaft 637. A controllable actuator (not shown) mounted on the horizontal housing, or on the vertical leg, is arranged adjacent a rotatable joint 639 between the horizontal housing 636 and the leg 628. In this way the vertical housing of the vertically extending leg 628 including the propellers 629 is rotatable 360° about a vertical axis coinciding with the vertical shaft 637 of the transmission. The rotary action is indicated by the arrow C. This arrangement improves the manoeuvrability of the vessel and also allows the vertically extending leg to be provided with different sets of propellers. A common interface is provided at or adjacent the joint 639 between the horizontal and vertical housings and the respective transmission shafts to facilitate replacement or exchange of the vertical leg 628 and the propellers. In this way, the propulsion unit can either be provided with standard dual counter rotating propellers or with a dual forward-facing drive to enable wake surfing. The provision of two separate motors also provides a redundancy, wherein a limp home mode can be used if one motor fails.

Figure 11:
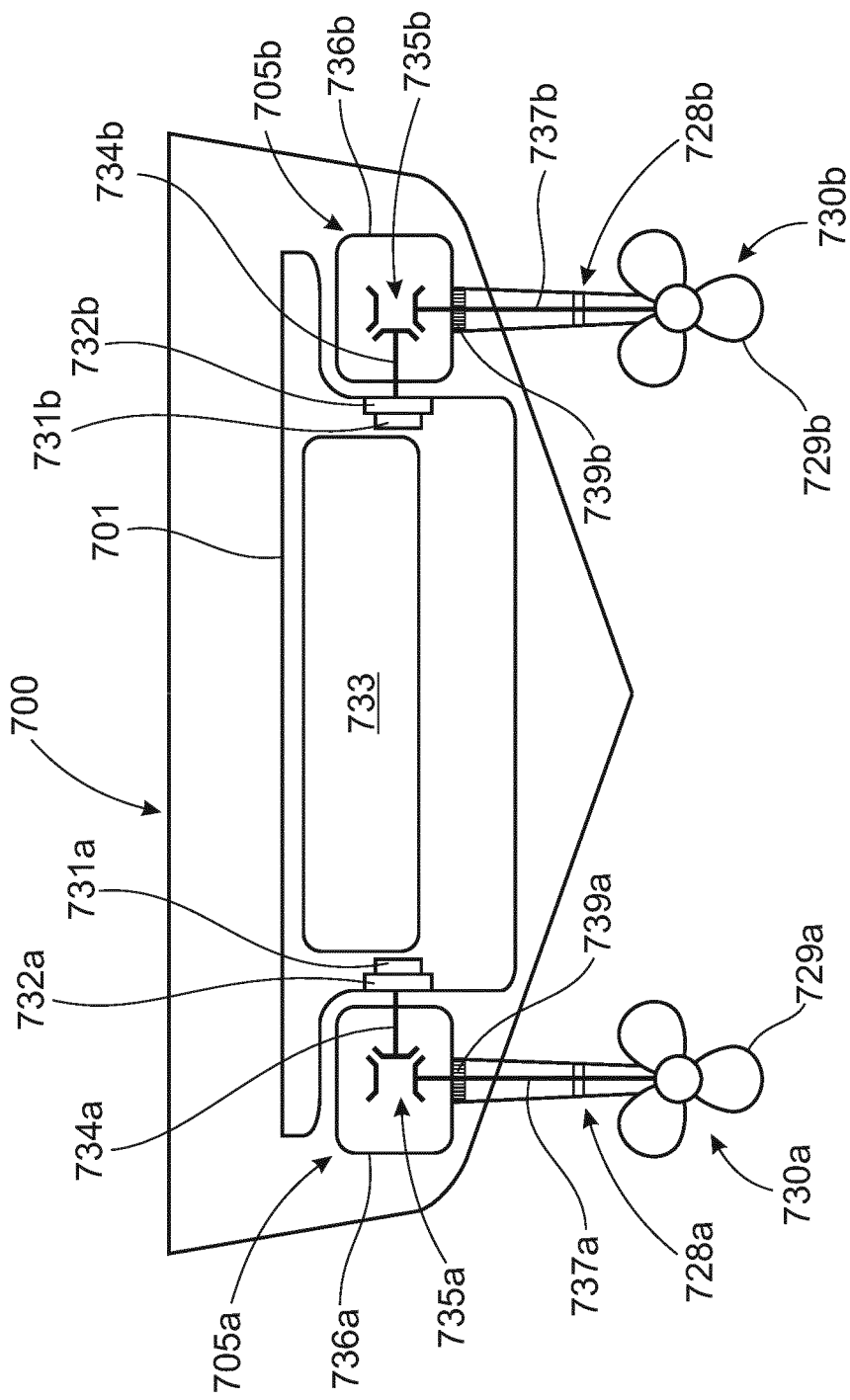
FIG. 11 shows a schematic rear view illustration of a pair of folding propulsion units according to a second example.

FIG. 11 shows a schematic rear view illustration of a detachable auxiliary hull unit with pair of folding propulsion units, according to a second example. The auxiliary hull unit 701 can be attached to a vessel 700 in the same way as described in FIG. 9 above. In this first example, the auxiliary hull unit 701 is provided with a single two propulsion units 730a, 730b comprising two electric motors 731a, 731b that separately power a transmission for driving individual sets of counter-rotating propellers 729a, 729b. In this example, the electric motors 731a, 731b are identical and arranged back-to-back on one side of their respective transmission, with concentric output shafts extending in opposite directions in the transverse direction of the auxiliary hull unit 701. The electric motors 731a, 731b have opposing output shafts each connected to their transmissions via a first gearing 732a, 732b, comprising a reduction gear or a planetary gear. The electric motors 731a, 731b are powered by battery pack 733. The electric motors 731a, 731b, the first gearing 732a, 732b and the battery pack 733 are located within a sealed, watertight compartment in the auxiliary hull unit 701. The respective first gearings 732a, 732b have opposing output shafts with concentric axes, which in this case are concentric with the output shafts of the electric motors.

Each first gearing 732a, 732b has an output shaft in the form of a horizontal shaft 734a, 734b extending into a cavity 705a, 705b of the auxiliary hull unit 701, towards an angular gearing 735a, 735b. The cavities 705a, 705b comprise recesses along the lower and side portions of the auxiliary hull unit 701, which recesses are open at the rear of the hull unit 701. Each angular gearing 735a, 735b comprises bevel gears and is connected to a vertical shaft 737a, 737b extending through a vertical leg 728a, 728b down to a gearbox for the dual counter rotating propellers 729. The legs 728a, 728b and the shafts 737a, 737b are assumed to be vertical or near vertical when the propulsion units 730a, 730b are in their driving positions, as shown in FIG. 11. The horizontal shafts 734a, 734b and their angular gearings 735a, 735b are each enclosed in a horizontal housing 736a, 736b extending into their respective cavity 705a, 705b. Each horizontal housing 736a, 736b is rotatable relative to the horizontal shafts 734a, 734b and the angular gearings 735a, 735b about the axis of rotation of said shafts. A controllable actuator (not shown; see FIG. 10; "actuators 638a, 638b"), such as electric motor driving a gear wheel, is arranged adjacent each horizontal housing 736a, 736b and can be actuated to rotate the housings 736a, 736b and the attached propulsion units 730a, 730b between a lifted inactive position and a lowered driving position. The arrangement allows the vertical legs 728a, 728b and the propellers 729a, 729b to be swung upwards and be lifted out of the water just like an outboard engine, in order to reduce corrosion and fouling.

Each vertical leg 728a, 728b is attached to their respective horizontal housing 736a, 736b adjacent the angular gearing 735a, 735b and is rotatable relative to the horizontal housing 736a, 736b about an axis coinciding with the axis of rotation of the respective vertical shaft 737a, 737b. Controllable actuators (not shown) mounted on each housing, or on each vertical leg, is arranged adjacent a rotatable joint 739a, 739b between the horizontal housing 736a, 736b and the leg 728a, 728b. In this way the lower portion of the vertically extending legs 728a, 728b including the propellers 729a, 729b can be individually rotated 360° about a vertical axis coinciding with the respective vertical shaft 737a, 737b of the transmission. A common interface is provided at or adjacent the joints 739a, 739b between the horizontal and vertical housings and the respective transmission shafts to facilitate replacement or exchange of the vertical leg 728 and the propellers. This arrangement improves the manoeuvrability of the vessel and also allows the vertically extending legs to be provided with different sets of propellers. In this way, the propulsion units can either be provided with standard dual counter rotating propellers or with a dual forward-facing drive to enable wake surfing. The provision of two separate motors also provides a redundancy, wherein a limp home mode can be used if one motor fails.

The auxiliary hull units described in FIGS. 9-11 preferably comprise a self-contained, internal source of power and/or power storage connected to the at least one propulsion unit as described in the above examples. However, the auxiliary hull unit can also be connected to a power storage located on-board the marine vessel to which the hull unit is mounted. The internal power storage can be a rechargeable battery pack for relatively short distance travel, or fuel cells using alternative fuels for travelling longer distances. One or more battery packs or fuel tanks for alternative fuels can be distributed within the auxiliary hull unit to achieve an optimal weight distribution. When battery packs with a limited range are provided for driving the at least one propulsion unit, it can be an option to provide a small combustion engine or generator to be used as a hybrid range extender. In the case of fuel cells operated using hydrogen, it may be required to provide hydrogen tanks on-board the marine vessel due to the space occupied by such tanks. Although the above examples are mainly directed to operation using electric motors, the invention is not limited to such a propulsion source. Suitable alternative power sources include internal combustion engines, which can be operated on fossil fuel, biofuel (liquid or gas), or other alternative fuels, can be used within the scope of the invention.

The auxiliary hull units 601, 701 described in the above examples are provided with one or more electrically driven propulsion units, although other types of propulsion units comprising an ICE using fossil fuels, biofuels or suitable alternative fuels can be used. External components, such as the propulsion units mounted in cavities in the auxiliary hull units are exposed to the environment. Internal component parts are located in a sealed, watertight compartment where they can be protected from the corrosive marine environment. A preferred embodiment involves a self-contained auxiliary hull unit, which comprises at least one power storage unit, an electronic control unit (ECU) for the electrical components, an optional hydraulics unit and a control unit for such a hydraulics unit. The use of multiple battery packs facilitates packing of the batteries in the auxiliary hull unit and provides redundancy in case of a failure of one battery pack. The electric propulsion units are controlled by the ECU, which comprises power electronics and electrical circuits for monitoring and controlling the battery packs. The ECU is also controlled by an operator via suitable wiring from the auxiliary hull unit to an operator position on-board the marine vessel onto which the hull unit is attached. The optional hydraulics unit can comprise a pump, a hydraulic circuit, an optional accumulator and controllable valves, all connected to hydraulic actuators used for driving any auxiliary hydraulic units when provided. The components in the hydraulics unit are controlled by the hydraulics control unit, which are in turn controlled by an operator via suitable wiring from the auxiliary hull unit to an operator position on-board the marine vessel. Hydraulic actuator can, for instance, replace electrical actuators for controlling the lifting or steering of the propulsion units. Hence, when an auxiliary hull unit is attached to a vessel by suitable fastening means, the only additional connection to the vessel comprises electrical connectors and the electrical wiring for controlling the propulsion unit and an optional hydraulics unit. Electrical connectors for the electrical wiring having a suitable IP-classification are well known in the field of marine vessels and will not be described in detail.

The component parts enclosed within the auxiliary hull unit can be exchanged or adapted during manufacture in order to adapt the unit to the type of propulsion unit, power source and/or power storage desired. The internal power storage can be a rechargeable battery pack for relatively short distance travel, or fuel cells for travelling longer distances. One or more battery packs or fuel tanks for alternative fuels can be distributed within the auxiliary hull unit to achieve an optimal weight distribution. When battery packs with a limited range are provided for driving the at least one propulsion unit, it can be an option to provide a small combustion engine or generator to be used as a hybrid range extender. In the case of fuel cells operated using hydrogen, it may be required to provide hydrogen tanks on-board the marine vessel due to the space occupied by such tanks. Alternatively, the hull unit can also be connected to a power storage located on-board the marine vessel to which the hull unit is mounted. Such an arrangement will require additional connectors and conduits between the vessel and the hull unit.

It is to be understood that the present invention is not limited to the embodiments described above and illustrated in the drawings; rather, the skilled person will recognize that many changes and modifications may be made within the scope of the appended claims. For instance, vessels may comprise fixed hydrofoils or hydrofoils with control surfaces as indicated in the background section above. Although no such features are described in the above examples, the invention is applicable to both types of hydrofoils.

Further, although most examples listed above relate to counter-rotating propellers the invention is not limited to duo-prop solutions. The inventive concept can be applied to single- or multiple-screw propulsion units.

The invention claimed is:

1. An auxiliary hull unit detachably mountable to a transom on a marine vessel, wherein the hull unit is mountable at least partially below the water line of the vessel and arranged to extend rearwards parallel to a rearward extension of hull sections adjacent to the hull unit, the hull unit comprises a rear hydrofoil system for the marine vessel; the rear hydrofoil system comprising at least one pair of foldable hydrofoils which are pivotable in a lateral direction relative to the hull unit, wherein each hydrofoil is controllable by at least one actuator for displacement of the at least one pair of foldable hydrofoils in the lateral direction of the hull unit between a stowed position and a deployed position, wherein each foldable hydrofoil comprises a first portion comprising a first end which first end is mounted hinged relative to the hull unit and on opposite sides thereof;

each foldable hydrofoil comprises a second portion comprising a free second end extending away from the respective first portion towards the opposite side of the hull unit and at an obtuse angle relative to the first portion;

wherein the foldable hydrofoils are at least flush with the hull unit in the stowed position.

2. Auxiliary hull unit according to claim 1, wherein the first portion of each hydrofoil extends adjacent the hull unit along its entire length when the hydrofoil is in the stowed position; and the second portion of each hydrofoil is arranged to extend into a lateral cavity in the hull unit when the hydrofoil is in the stowed position.

3. Auxiliary hull unit according to claim 2, wherein the second portion of each hydrofoil is arranged to extend inwards and upwards into the lateral cavity in the hull unit when the hydrofoil is in the stowed position.

4. Auxiliary hull unit according to claim 2, wherein the free second end of each second portion is arranged to extend up to a vertical plane through the longitudinal axis of the hull unit when the hydrofoil is in the stowed position.

5. Auxiliary hull unit according to claim 1, wherein each first portion extends adjacent the hull unit up to a central longitudinal axis of the hull unit when the hydrofoil is in the stowed position; and the free second end of each hydrofoil extends adjacent the hull unit past the central longitudinal axis of the hull unit.

6. Auxiliary hull unit according to claim 5, wherein the free second ends of each pair of hydrofoils are arranged to extend a predetermined distance past the central longitudinal axis of the hull unit.

7. Auxiliary hull unit according to claim 5, wherein the free second ends of each pair of hydrofoils are arranged to overlap when the hydrofoils are in the stowed position.

8. Auxiliary hull unit according to claim 5, wherein the overlapping hydrofoils are arranged to be displaced sequentially when moved towards the deployed position.

9. Auxiliary hull unit according to claim 1, wherein the first end of each foldable hydrofoil comprises a hinge having parallel pivot axes extending in the longitudinal axis of the hull unit.

10. Auxiliary hull unit according to claim 1, wherein each hydrofoil is connected to the at least one actuator arranged within the hull unit and arranged to displace the hydrofoils between their stowed and deployed positions.

11. Auxiliary hull unit according to claim 10, wherein the at least one actuator is arranged to be operated by a power source within the hull unit (101).

12. Auxiliary hull unit according to claim 1, wherein the hull unit comprises a pod propulsion unit arranged to be vertically displaceable between a stowed position and a deployed position.

13. Auxiliary hull unit according to claim 12, wherein the hull unit comprises a power storage connected to the pod propulsion unit.

14. A marine vessel, comprising an auxiliary hull unit according to claim 1, which is detachably mounted to a transom on the marine vessel.

* * * * *